(12) United States Patent
Barber et al.

(10) Patent No.: US 11,740,337 B1
(45) Date of Patent: Aug. 29, 2023

(54) LIGHT DETECTION AND RANGING (LIDAR) SENSOR SYSTEM INCLUDING TRANSCEIVER DEVICE

(71) Applicant: Aurora Operations, Inc., Mountain View, CA (US)

(72) Inventors: Zeb William Barber, Bozeman, MT (US); Stefan Heineman, Bozeman, MT (US); Randy Ray Reibel, Bozeman, MT (US)

(73) Assignee: Aurora Operations, Inc., Mountain View, CA (US)

( * ) Notice: Subject to any disclaimer, the term of this patent is extended or adjusted under 35 U.S.C. 154(b) by 0 days.

(21) Appl. No.: 17/888,355

(22) Filed: Aug. 15, 2022

(51) Int. Cl.
*G01S 7/4913* (2020.01)
*G01S 7/481* (2006.01)
*G01S 17/34* (2020.01)
*G01S 17/931* (2020.01)

(52) U.S. Cl.
CPC .......... *G01S 7/4913* (2013.01); *G01S 7/4817* (2013.01); *G01S 17/34* (2020.01); *G01S 17/931* (2020.01)

(58) Field of Classification Search
CPC .... G01S 7/4811; G01S 7/4813; G01S 7/4814; G01S 7/4815; G01S 7/4816; G01S 7/4817; G01S 7/4818; G01S 7/484; G01S 7/486; G01S 7/4861; G01S 17/10; G01S 17/26; G01S 17/34; G01S 17/36; G01S 17/931
See application file for complete search history.

(56) References Cited

U.S. PATENT DOCUMENTS

| | | | | |
|---|---|---|---|---|
| 2010/0277714 A1* | 11/2010 | Pedersen | ................. | G01S 7/497 356/28 |
| 2013/0162976 A1* | 6/2013 | Dakin | ....................... | G01P 5/26 356/28.5 |
| 2015/0109605 A1* | 4/2015 | Major, Jr. | ............ | G01S 7/4868 356/28 |
| 2018/0191132 A1* | 7/2018 | Hu | ........................... | H01S 5/50 |
| 2019/0257927 A1* | 8/2019 | Yao | ....................... | G01S 17/931 |
| 2020/0088876 A1* | 3/2020 | Tanemura | ............... | G01S 7/006 |
| 2021/0396887 A1* | 12/2021 | Schmalenberg | ...... | H01L 31/105 |
| 2022/0011409 A1* | 1/2022 | Hosseini | ............... | G01S 7/4817 |
| 2022/0370010 A1* | 11/2022 | Zilkie | .................. | A61B 5/6804 |

* cited by examiner

*Primary Examiner* — Yuqing Xiao
*Assistant Examiner* — Benjamin Richard Hebert
(74) *Attorney, Agent, or Firm* — FOLEY & LARDNER LLP

(57) ABSTRACT

A light detection and ranging (lidar) system may include a transceiver, a first device including a laser source configured to generate a beam, and one or more optical components, a second device including one or more analog-to-digital converters (ADCs), and a processor configured to alternately turn on the first device and turn on the transceiver. The first device may be configured to generate, based on the beam, an optical signal associated with a local oscillator (LO) signal. The transceiver may be configured to transmit the optical signal to an environment, in response to transmitting the optical signal, receive a returned optical signal that is reflected from an object in the environment, and pair the returned optical signal with the LO signal to generate an electrical signal. The second device may be configured to generate, based on the electrical signal, a digital signal.

20 Claims, 14 Drawing Sheets

LIGHT DETECTION AND RANGING (LIDAR) SENSOR SYSTEM INCLUDING TRANSCEIVER DEVICE

BACKGROUND

Light detection and ranging (lidar) sensor systems are used for a variety of applications, from altimetry, to imaging, to collision avoidance. Lidar provides finer scale range resolution with smaller beam sizes than conventional microwave ranging systems, such as radio-wave detection and ranging (radar). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

In applying these techniques, a lidar sensor system may need to use limited or expensive hardware resources (e.g., receive (RX)-side hardware resources such as analog-to-digital converters (ADCs)). There is a need for a mechanism to efficiently share such limited hardware resources among other circuit modules. Moreover, in designing and implement a photonic integrated circuit (PIC) or integrated optical circuit which is a chip that contains photonic components, there is a need for a chip-scale package solution to efficiently share such limited hardware resources among other circuit modules.

SUMMARY

Implementations of the present disclosure relate to a system and a method for a light detection and ranging (lidar) sensor system, and more particularly to a system and a method for a lidar sensor system including a transceiver module (or a transceiver device).

In some implementations of the present disclosure, a light detection and ranging (lidar) system may include a transceiver, a first device including a laser source configured to generate a beam, and one or more optical components, a second device including one or more analog-to-digital converters (ADCs), and a processor configured to alternately turn on the first device and turn on the transceiver. The first device may be configured to generate, based on the beam, an optical signal associated with a local oscillator (LO) signal. The transceiver may be configured to transmit the optical signal to an environment, in response to transmitting the optical signal, receive a returned optical signal that is reflected from an object in the environment, and pair the returned optical signal with the LO signal to generate an electrical signal. The second device may be configured to generate, based on the electrical signal, a digital signal.

In some implementations of the present disclosure, an autonomous vehicle control system may include one or more processors, and one or more computer-readable storage mediums storing instructions which, when executed by the one or more processors, cause the one or more processors to alternately turn on the first device and turn on the transceiver. The first device may include a laser source configured to generate a beam, and one or more optical components. The instructions may cause the first device to generate, based on the beam, an optical signal associated with a local oscillator (LO) signal. The instructions may cause the transceiver to transmit the optical signal to an environment, and in response to transmitting the optical signal, receive a returned optical signal that is reflected from an object in the environment, and pair the returned optical signal with the LO signal to generate an electrical signal. The instructions may cause a second device to generate, based on the electrical signal, a digital signal. The second device may include one or more analog-to-digital converters (ADCs). The instructions may control operation of a vehicle using the digital signal.

In some implementations of the present disclosure, an autonomous vehicle may include at least one of a steering system or a braking system, and a vehicle controller including one or more processors. The one or more processors may be configured to alternately turn on the first device and turn on the transceiver. The first device may include a laser source configured to generate a beam, and one or more optical components. The one or more processors may be configured to cause the first device to generate, based on the beam, an optical signal associated with a local oscillator (LO) signal. The one or more processors may be configured to cause a transceiver to transmit the optical signal to an environment, and in response to transmitting the optical signal, receive a returned optical signal that is reflected from an object in the environment, pair the returned optical signal with the LO signal to generate an electrical signal. The one or more processors may be configured to cause a second device to generate, based on the electrical signal, a digital signal. The second device may include one or more analog-to-digital converters (ADCs). The one or more processors may be configured to control the at least one of the steering system or the braking system using the digital signal.

In some implementations of the present disclosure, a method for controlling a light detection and ranging (lidar) system including a transceiver, a first device including a laser source configured to generate a beam, and one or more optical components, a second device including one or more analog-to-digital converters (ADCs), and a processor configured to alternately turning on the first device and turning on the transceiver. The method may include generating, by the first device, based on the beam, an optical signal associated with a local oscillator (LO) signal. The method may include transmitting, by the transceiver, the optical signal to an environment, in response to transmitting the optical signal, receiving a returned optical signal that is reflected from an object in the environment, and pairing the returned optical signal with the LO signal to generate an electrical signal. The method may include generating, by the second device, based on the electrical signal, a digital signal.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

According to certain aspects, implementations in the present disclosure relate to a system and a method for controlling a vehicle using light detection and ranging (lidar), and more particularly to a system and a method for a lidar sensor system including a transceiver module (or a transceiver device).

According to certain aspects, a light detection and ranging (lidar) system may include a transceiver, a first device including a laser source configured to generate a beam, and one or more optical components, a second device including one or more analog-to-digital converters (ADCs), and a processor configured to alternately turn on the first device and turn on the transceiver. The first device may be configured to generate, based on the beam, an optical signal associated with a local oscillator (LO) signal. The transceiver may be configured to transmit the optical signal to an environment, in response to transmitting the optical signal, receive a returned optical signal that is reflected from an object in the environment, and pair the returned optical signal with the LO signal to generate an electrical signal. The second device may be configured to generate, based on the electrical signal, a digital signal.

1. System Environment for Autonomous Vehicles

Figure 1A:
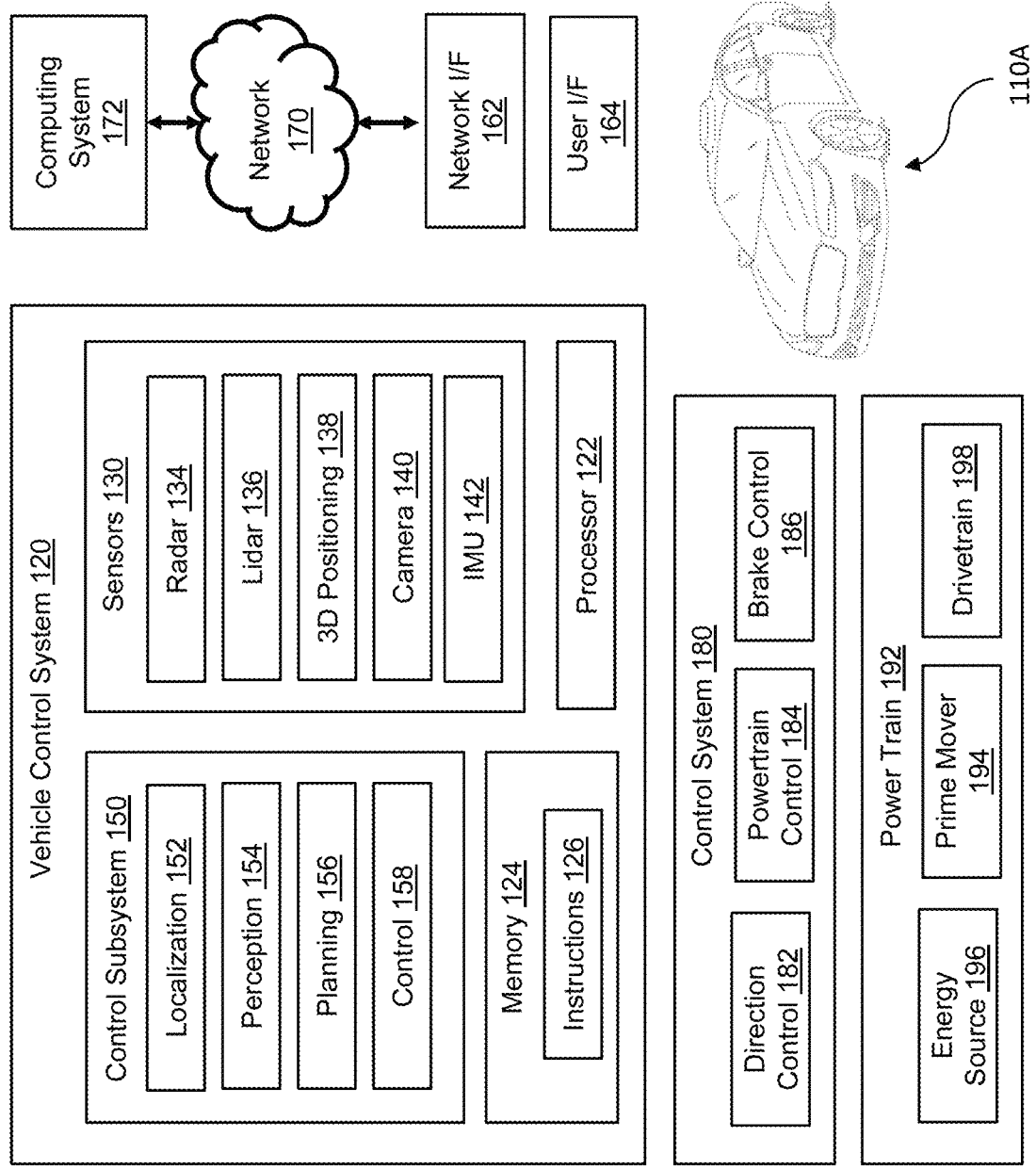
FIG. 1A is a block diagram illustrating an example of a system environment for autonomous vehicles according to some implementations.

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 102, e.g., to control the output power of the prime mover 194, to control a gear of a transmission in the drivetrain 198, etc., thereby controlling a speed and/or direction of the vehicle 110A. The brake control 116 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received through another computer or electronic device, e.g., through an app on a mobile device or through a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 through the network 170 for additional processing. A time stamp can be added to each instance of vehicle data prior to uploading. Additional processing of autonomous vehicle data by computing system 172 in accordance with many implementations is described with respect to FIG. 2.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A through network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 2:
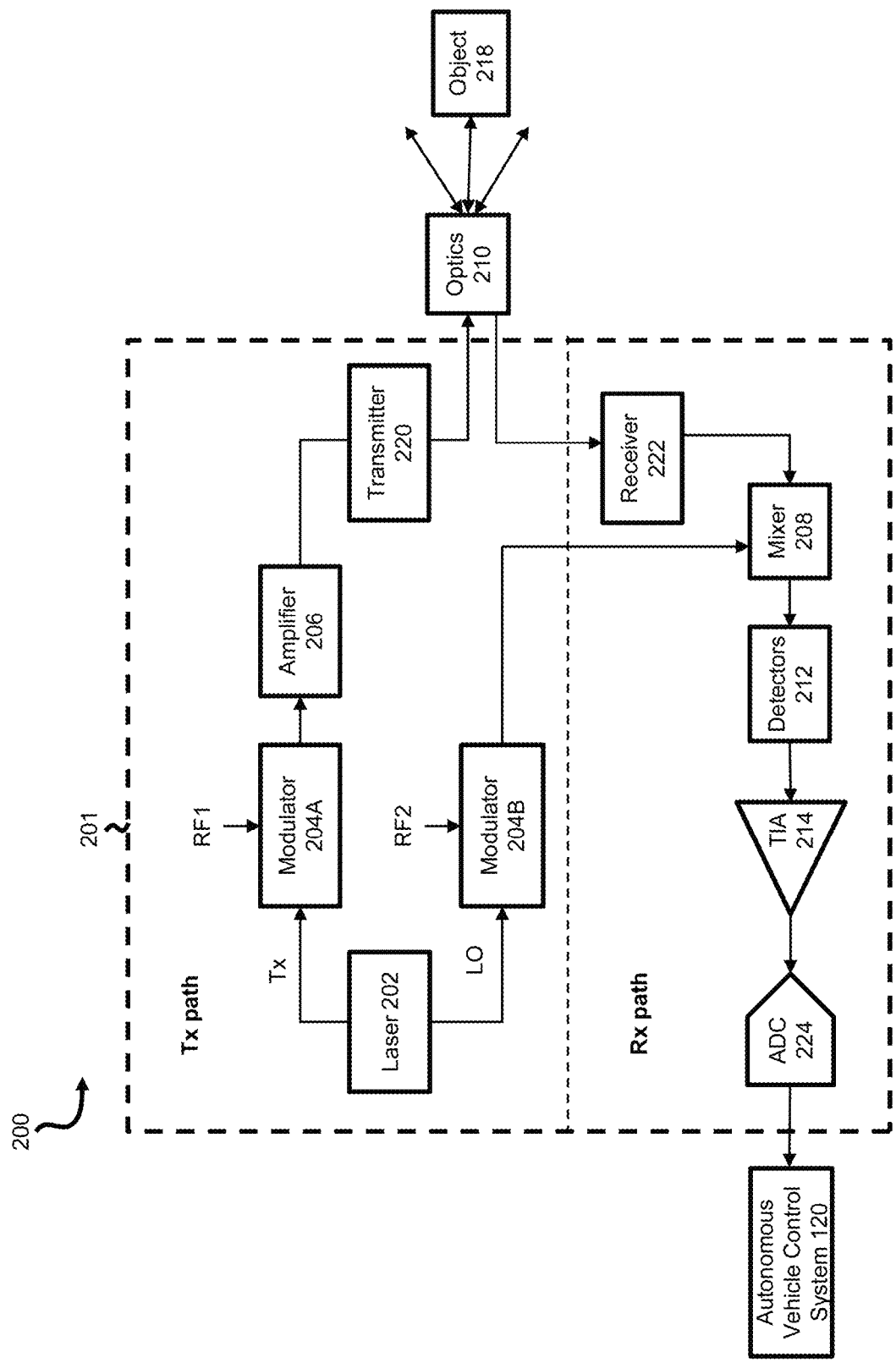
FIG. 2 is a block diagram illustrating an example of a lidar sensor system for autonomous vehicles, according to some implementations.
Figure 3A:
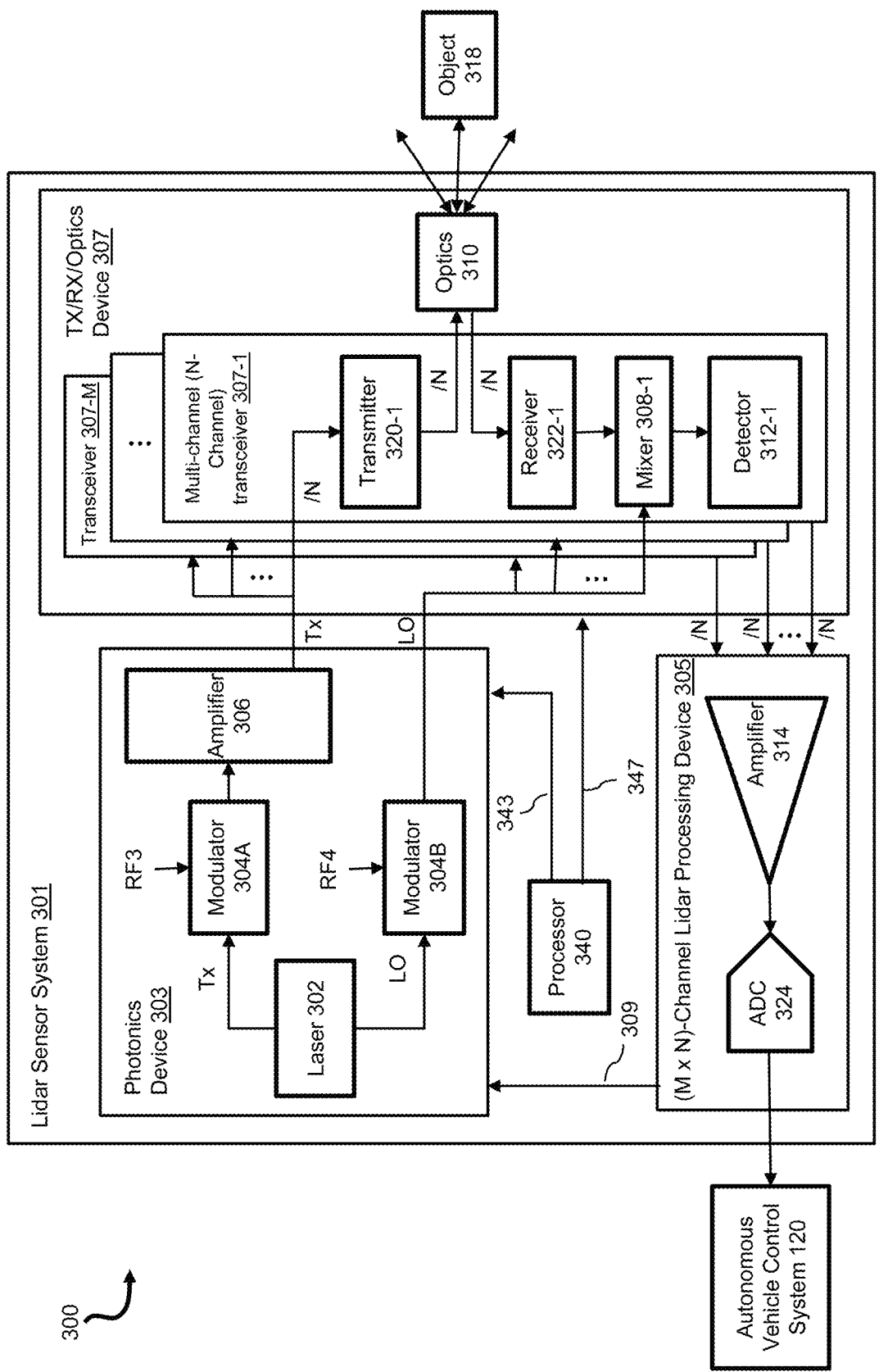
FIG. 3A is a block diagram illustrating an example of a lidar sensor system according to some implementations.
Figure 3B:
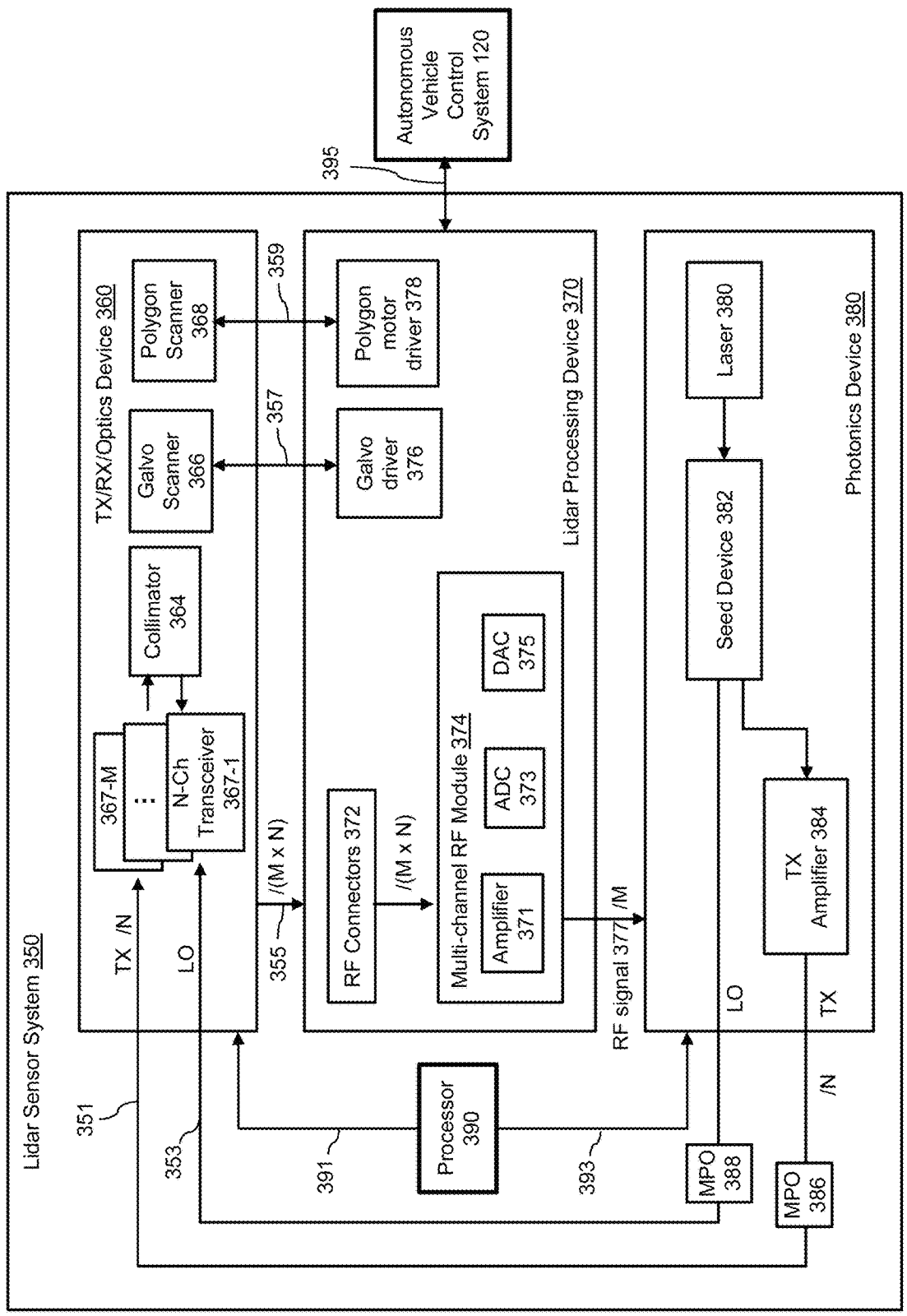
FIG. 3B is a block diagram illustrating another example of a lidar sensor system according to some implementations.

A truck can include a lidar system (e.g., vehicle control system 120 in FIG. 1A, lidar system 201 in FIG. 2, lidar system 301 in FIG. 3A, lidar sensor system 350 in FIG. 3B, etc.). In some implementations, the lidar system can use frequency modulation to encode an optical signal and scatter the encoded optical signal into free-space using optics. By detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). The lidar system can use phase modulation (PM) to encode an optical signal and scatters the encoded optical signal into free-space using optics.

An FM or phase-modulated (PM) lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hit the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 130 in FIG. 1A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 130 in FIG. 1A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some or all of the optical components for an FM lidar can be produced on a single chip, which produces its own benefits, as discussed herein.

3. Commercial Trucking

Figure 1B:
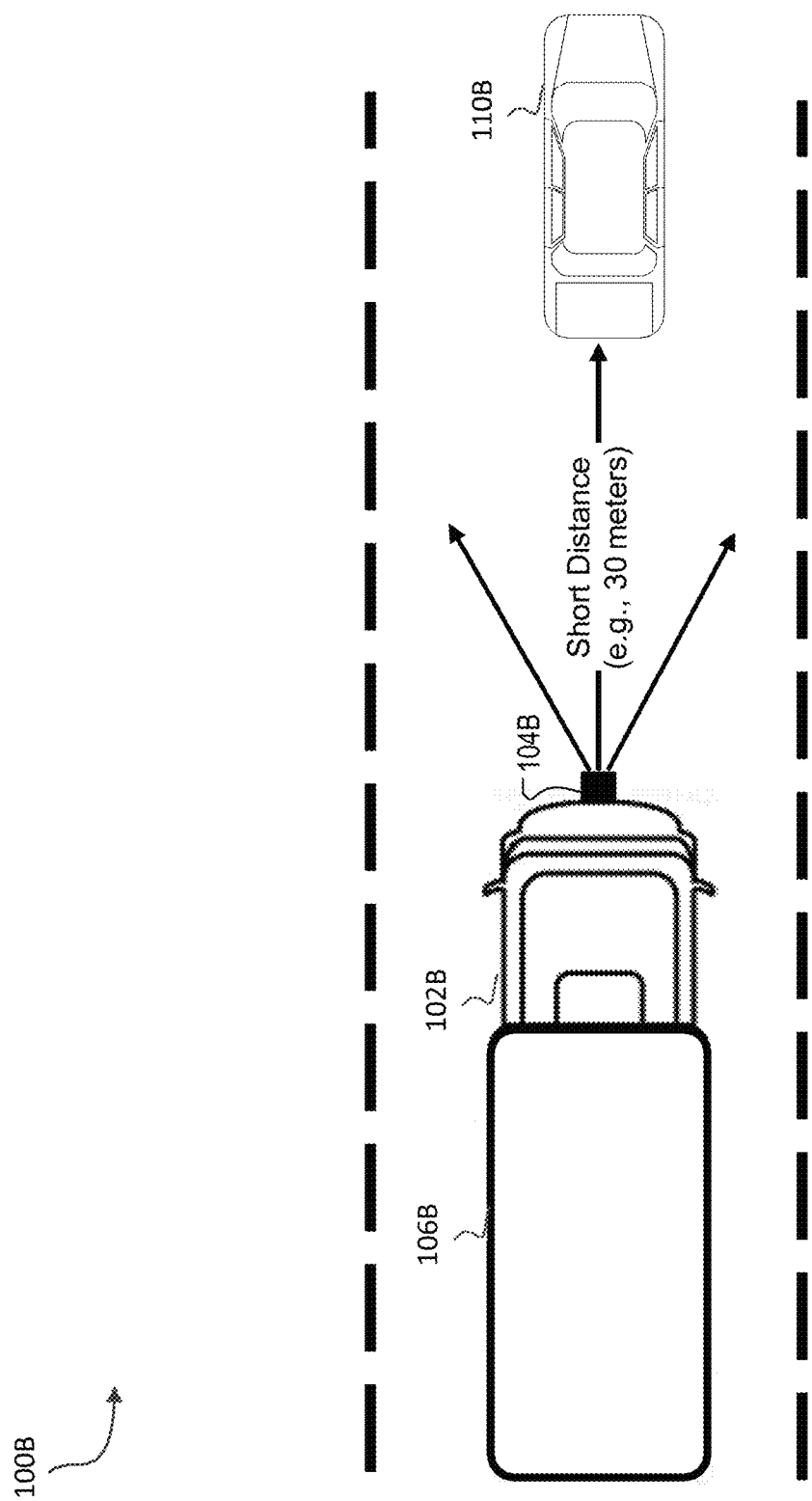
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a lidar system 104B (e.g., an FM lidar system, vehicle control system 120 in FIG. 1A, lidar system 201 in FIG. 2, lidar system 301 in FIG. 3A, lidar system 350 in FIG. 3B, etc.) for determining a distance to the object 110B and/or measuring the velocity of the object 110B. Although FIG. 1B shows that one lidar system 104B is mounted on the front of the commercial truck 102B, the number of lidar system and the mounting area of the lidar system on the commercial truck are not limited to a particular number or a particular area. The commercial truck 102B may include any number of lidar systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the lidar system 104B in environment 100B may be configured to detect an object (e.g., another vehicle, a bicycle, a tree, street signs, potholes, etc.) at short distances (e.g., 30 meters or less) from the commercial truck 102B.

Figure 1C:
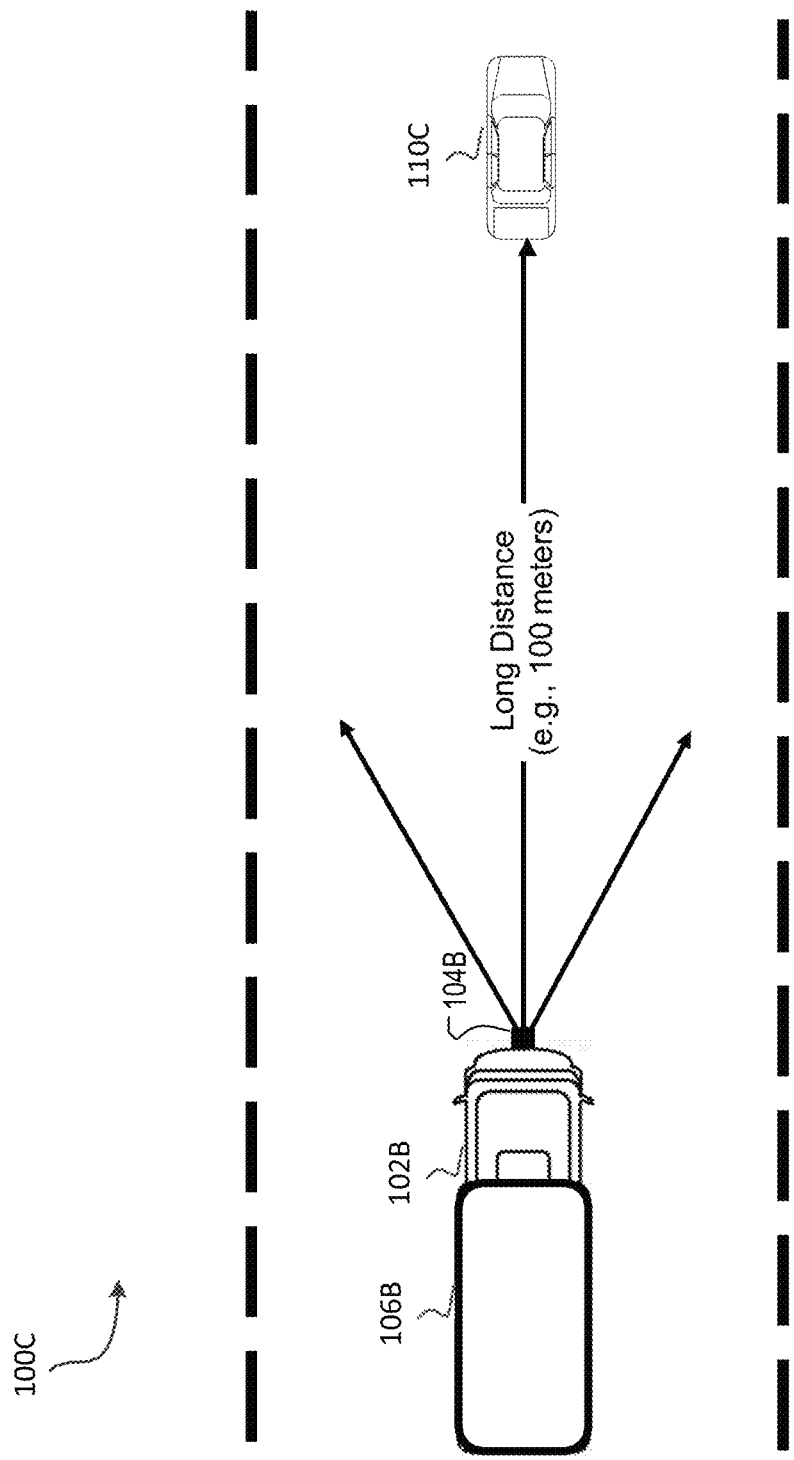
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, lidar system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the lidar system 104B in environment 100C may be configured to detect an object (e.g., another vehicle, a bicycle, a tree, street signs, potholes, etc.) at a distance (e.g., 100 meters) from the commercial truck 102B.

Figure 1D:
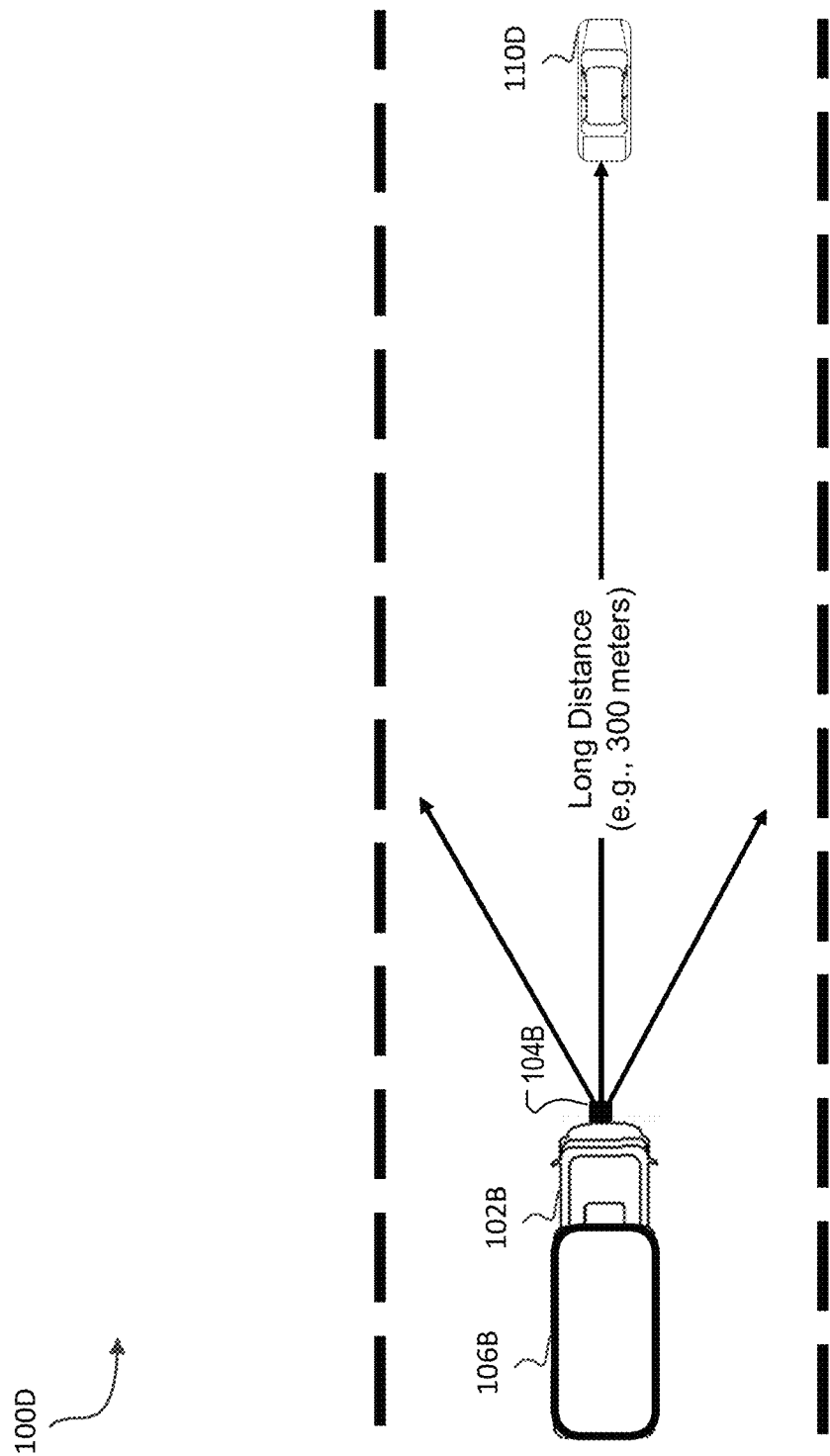
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102B, cargo 106B, lidar system 104B, etc.) that are included in environment 100B.

The environment 100D includes an object 110D (shown in FIG. 1D as another vehicle) that is within a distance range that is more than 150 meters from the commercial truck 102B. As shown, the lidar system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semi-autonomous applications, in which the commercial truck has a driver and some functions of the commercial truck are autonomously operated using the FM or PM lidar system, or fully autonomous applications, in which the commercial truck is operated entirely by the FM or lidar system, alone or in combination with other vehicle systems.

4. Continuous Wave Modulation and Quasi-Continuous Wave Modulation

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

5. LIDAR System for Autonomous Vehicles

FIG. 2 is a block diagram illustrating an example environment of a lidar sensor system for autonomous vehicles, according to some implementations. The environment 200 includes a lidar sensor system 201 that includes a transmit (Tx) path and a receive (Rx) path. The Tx path includes one or more Tx input/output ports (not shown in FIG. 2) and the Rx path includes one or more Rx input/output ports (not shown in FIG. 2).

In some implementations, a semiconductor substrate and/or semiconductor package may include the Tx path and the Rx. In some implementations, the semiconductor substrate and/or semiconductor package may include at least one of silicon photonics circuitry, photonic lightwave circuit (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The environment 200 includes one or more transmitters 220 and one or more receivers 222.

The environment 200 includes one or more optics 210 (e.g., an oscillatory scanner, a unidirectional scanner, a Risley prism, a circulator optic, and/or a beam collimator, etc.) that are coupled to the lidar system 201. In some implementations, the one or more optics 210 may be coupled to the Tx path through the one or more Tx input/output ports. In some implementations, the one or more optics 210 may be coupled to the Rx path through the one or more Rx input/output ports.

The environment 200 includes a vehicle control system 120 (e.g., vehicle control system 120 in FIG. 1) that is coupled to the lidar system 201. In some implementations, the vehicle control system 120 may be coupled to the Rx path through the one or more Rx input/output ports.

The Tx path may include a laser source 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs). Although FIG. 2 shows only a select number of components and only one input/output channel; the environment 200 may include any number of components and/or input/output channels (in any combination) that are interconnected in any arrangement to facilitate combining multiple functions of a lidar system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1400 nanometers.

The laser source 202 may be configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A may be configured to send the modulated light signal to the amplifier 206. The amplifier 206 may be configured to amplify the modulated light signal to generate an amplified light signal to the optics 210 through the one or more transmitters 220. The one or more transmitters 220 may include one or more optical waveguides or antennas.

The optics 210 may be configured to steer the amplified light signal that it receives from the Tx path into an environment within a given field of view toward an object 218, may receive a returned signal reflected back from the object 218, and provide the returned signal to the mixer 208 of the Rx path through the one or more receivers 222. The one or more receivers 222 may include one or more optical waveguides or antennas. In some arrangements, the transmitters 220 and the receivers 222 may constitute one or more transceivers (not shown in FIG. 2). In some arrangements, the one or more transceivers may include a monostatic transceiver or a bistatic transceiver.

The laser source 202 may be configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 may be configured to mix (e.g., combine, multiply, etc.) the modulated LO signal with the returned signal to generate a down-converted signal and send the down-converted signal to the detector 212. In some arrangements, the mixer 208 may be configured to send the modulated LO signal to the detector 212.

The detector 212 may be configured to generate an electrical signal based on the down-converted signal and send the electrical signal to the TIA 214. In some arrangements, the detector 212 may be configured to generate an electrical signal based on the down-converted signal and the modulated signal.

The TIA 214 may be configured to amplify the electrical signal and send the amplified electrical signal to the vehicle control system 120 through the one or more ADCs 220.

In some implementations, the TIA 214 may have a peak noise-equivalent power (NEP) that is less than 5 picoWatts per square root Hertz (i.e., 5×10-12 Watts per square root Hertz). In some implementations, the TIA 214 may have a gain between 4 kiloohms and 25 kiloohms In some implementations, detector 212 and/or TIA 214 may have a 3 decibel bandwidth between 80 kilohertz (kHz) and 450 megahertz (MHz).

A vehicle control system (e.g., the control subsystem 150) may be configured to determine a distance to the object 218 and/or measures the velocity of the object 218 based on the one or more electrical signals that it receives from the TIA through the one or more ADCs 224.

In some implementations, modulator 204A and/or modulator 204B may have a bandwidth between 400 megahertz (MHz) and 1000 (MHz).

In some implementations, the modulator 204A may be configured to send a first modulated light (optical) signal and a second modulated light (optical) signal to the amplifier 206. The amplifier 206 may be configured to amplify the first and second modulated light signals to generate amplified light signals to the optics 210 through the transmitters 220. The optics 210 may be configured to steer the first and second modulated light signals that it receives from the Tx path into an environment within a given field of view toward an object 218, may receive corresponding first and second returned signals reflected back from the object 218, and provide the first and second returned signals to the mixer 208 of the Rx path through the receivers 222. The modulator 204B may be configured to generate (1) a first modulated LO signal associated with the first modulated light signal and (2) a second modulated LO signal associated with the second modulated light signal, and send the first and second modulated LO signals to the mixer 208 of the Rx path. The mixer 208 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 212. Similarly, the mixer 208 may be configured to pair the second returned light signal and the second modulated LO signal, and mix the second returned light signal and the second modulated LO signal to generate a second down-converted signal and send the second down-converted signal to the detector 212. The detector 212 may be configured to generate first and second electrical signals based on the first and second down-converted signal, respectively. The vehicle control system 120 may be configured to determine a distance to the object 218 and/or measures the velocity of the object 218 based on the first and second electrical signals, received through TIA 214 and ADCs 220.

6. A LIDAR System Including a Transceiver Module (Device)

A lidar sensor system may need to use limited or expensive hardware resources (e.g., receive (RX)-side hardware resources such as analog-to-digital converters (ADCs)). There is a need for a mechanism to efficiently share such limited hardware resources among other circuit modules. Moreover, in designing and implement a photonic integrated circuit (PIC) or integrated optical circuit which is a chip that contains photonic components, there is a need for a chip-scale package solution to efficiently share such limited hardware resources among other circuit modules.

To solve these problem, in some implementations, a lidar sensor system (e.g., FMCW or other coherent lidar sensor systems) may include a processor, a photonics module (e.g., photonics device or photonics assembly) as a first device, a lidar processing device including one or more ADCs (e.g., lidar computation assembly) as a second device, and a transmit (TX)/receive (RX)/optics device (e.g., free space optics assembly) including a plurality of sets of transceivers. In some implementations, the lidar sensor system may be configured to generate and transmit M×N optical signals (e.g., light beams, light signals) where M and N are integers (e.g., M≥2, N≥8), by alternately turning on the photonics module and turning on the TX/RX/optics device (or a set of N transceivers thereof) M times (e.g., by temporally multiplexing M sets of N transceivers) to transmit M×N optical signals to an environment. In response to transmitting the optical signals, the plurality of sets of transceivers (e.g., M×N transceivers) may receive returned signals in M×N channels, and the lidar processing device may then process the returned optical signals in M×N channels. In this manner, the lidar processing device (e.g., ADCs) can be efficiently shared among the plurality of sets of transceivers (e.g., M sets of N transceivers).

In some implementations, the lidar sensor system may be configured to generate M×N optical signals and transmit them to the environment substantially at the same time (e.g., without multiplexing M sets of N transceivers; M=1), and receive returned optical signals (e.g., optical signals returned from an object) and process the returned optical signals in N channels (M=1) substantially at the same time. For example, the lidar sensor system may include a photonics module that can generate N TX beams, provide the N TX beams and an LO signal to a transceiver device (or module) including N transceivers. The N transceivers may transmit N TX beams to the environment, receive returned optical signals in N RX channels as N RX optical signals, perform mixing and photo-detection on the N RX optical signals using the LO signal, and provide N electrical signals to a lidar processing device. The lidar processing device may process the N electrical signals using a plurality of ADCs (e.g., N ADCs). In this manner, the lidar sensor system may process N optical signals substantially at the same time. For example, the lidar sensor system may process 16 optical signals (N=16) substantially at the same time.

In some implementations, the lidar sensor system may be configured to generate N optical signals and transmit them to the environment at M different times (e.g., by temporally multiplexing M sets of N transceivers) during a period, and receive returned optical signals (e.g., optical signals returned from an object) and process the returned optical signals in M×N channels. For example, in a case where M=2, during a period, a photonics module of the lidar sensor system may generate N TX beams, provide the N TX beams and an LO signal to a transceiver device (or module) including 2N transceivers, twice (or at two different times), so that the 2N transceivers can transmit 2N TX beams to the environment during the period. In some implementations, during the period, the photonics module and a set of N transceivers (among 2N transceivers) can be alternately turned on twice (or at two different times) to thereby transmit 2N TX beams to the environment. For example, during the period, (1) the photonics module may be turned on to generate a first set of N optical signals, (2) a first set of N transceivers may be turned on to transmit the first set of N optical signals to the environment, (3) the photonics module may be turned on to generate a second set of N optical signals, and (4) a second set of N transceivers may be turned on to transmit the second set of N optical signals to the environment. The 2N transceivers may receive returned optical signals in 2N RX channels as 2N RX optical signals, perform mixing and photo-detection on the 2N RX optical signals using the LO signal, and provide 2N electrical signals to a lidar processing device including a plurality of ADCs (e.g., 2N ADCs). The lidar processing device may process the 2N electrical signals using the ADCs. In this manner, the lidar sensor system (or ADCs) can be efficiently shared among a first set of N transceivers and a second set of N transceivers. For example, the lidar sensor system may process 16 optical signals (M=2, N=8) by efficiently sharing ADCs among a first set of 8 transceivers and a second set of 8 transceivers.

In some implementations, the processor of the lidar sensor system may temporally multiplex M sets of N transceivers so that a (selected) set of N transceivers may transmit N optical signals to the environment at M different time during the period. In some implementations, the processor may determine a sequence of M sets of N transceivers and perform time sequencing according to the determined sequence so that each of M sets of N transceivers may transmit N optical signals to the environment, according to the sequence at M different times during the period. In some implementations, the lidar sensor system may be configured to generate and provide M×N LO signals to the TX/RX/optics device, similarly. For example, the processor may (1) temporally multiplex M sets of N transceivers so that a (selected) set of N transceivers may receive N LO signals at M different time during a period, or (2) determine a sequence of M sets of N transceivers and perform time sequencing according to the sequence so that each of M sets of N transceivers may receive N LO signals, according to the sequence at M different times during the period.

In some implementations, the photonics module of the lidar sensor system (as a first device) may include a laser source, a seed device (e.g., photonics seed module), and a plurality of TX amplifiers (e.g., photonics TX amplifier module). In some implementations, the laser source may be a laser diode (e.g., Distributed Feedback (DFB) laser diode). In some implementations, the laser source may generate laser having a wavelength in a range between 1530 nm and 1565 nm.

In some implementations, the seed device may include an input optical path, a first optical path, a plurality of second optical paths, a first optical amplifier, a plurality of second optical amplifiers, and a control circuit. The input optical path may be configured to receive, at one end thereof, a beam from the laser source. The first optical path and a plurality of second optical paths may be respectively branched from at the other end of the input optical path. The first optical amplifier may be coupled to the first optical path. The plurality of second optical amplifiers may be respectively coupled to the plurality of second optical paths. The control circuit may be configured to selectively turn on one of the plurality of second optical amplifiers to output a modulated optical signal of the beam as a TX optical signal. The control circuit may be configured to turn on the first optical amplifier to output a modulated optical signal of the beam as an LO signal. In this manner, the seed device may generate, based on a light beam from the laser source, a TX optical signal and an LO signal, provide the TX optical signal to the one or more TX amplifiers, and provide the LO signal to one or more transceivers of the TX/RX/optics device. In some implementations, the seed device may provide the LO signal to the one or more transceivers through one or more multi-fiber push on (MPO) connectors.

In some implementations, the plurality of TX amplifiers may include, at input sides thereof, a plurality of apertures to which the seed device may provide a single optical signal. In some implementations, the seed device may provide a TX optical signal to the plurality of TX amplifiers through one or more splitters. The one or more splitters may be one or more fiber splitters. A splitter may be coupled to an input side of an optical amplifier using one of butt coupling or lens coupling. For example, in butt coupling, an input side of an optical amplifier may be facing directly towards an output terminal (e.g., waveguide ends) of the seed device. In lens coupling, an input side of an optical amplifier and an output terminal of the seed device may be coupled using lens, e.g., ball lens. In this manner, the seed device can seed multiple TX amplifiers (e.g., tapered semiconductor optical amplifiers (SOAs) or a tapered SOA array) with multiple apertures with one optical signal.

Each of the plurality of TX amplifiers may receive a TX optical signal and output an amplified TX optical signal to one or more transceivers of the TX/RX/optics device. In some implementations, each TX amplifier may provide, based on the amplified TX optical signals through a splitter, a plurality of amplified TX optical signals to the one or more transceivers. In some implementations, one or more amplified TX optical signals may be output to the one or more transceivers through MPO connectors (e.g., 16 fibers for 16 TX optical signals).

In some implementations, the plurality of TX amplifiers may include a plurality of optical amplifiers. The optical amplifiers may include semiconductor optical amplifier (SOA), fiber Raman and Brillouin amplifier, or erbium-doped fiber amplifier (EDFA). For example, the plurality of TX amplifiers may include one or more EDFA with 4 W of input power level. In some implementations, the plurality of TX amplifiers may include an array of optical amplifiers. The optical amplifiers may include an SOA array, an array of fiber Raman and Brillouin amplifiers, or an EDFA array.

In some implementations, the plurality of TX amplifiers may include a plurality of tapered optical amplifiers (TPAs), each containing a tapered section in which a cross-section area of an amplified beam is gradually increased. The plurality of TPAs may include one or more of tapered SOA, tapered fiber Raman and Brillouin amplifier, or tapered EDFA. The plurality of TPAs may include one or more of a tapered SOA array, an array of tapered fiber Raman and Brillouin amplifier, or a tapered EDFA array.

In some implementations, the plurality of TX amplifiers may include a set of amplifiers in which an input side of one of the set of amplifiers is coupled to input sides of the others of the set of amplifiers. For example, a set of amplifiers may include five (5) TPAs (e.g., first to fifth TPAs) configured such that an input side of the first TPA is coupled with input sides of the second to fifth TPAs. In some implementations, the set of amplifiers with the foregoing configuration may be implemented in a chip (referred to as a U-turn chip). In some implementations, the seed device may provide a first TX optical signal to an output side of the first TPA such that (1) the first TX optical is inputted to the input sides of the second to fifth TPAs and (2) the second to fifth TPAs output four amplified TX optical signals.

In some implementations, the photonics module may include at least one of silicon photonics circuitry, photonic lightwave circuit (PLC), III-V semiconductor circuitry, or micro-optics circuitry. The III-V semiconductors may include at least one of indium nitride (InN) or gallium arsenide (GaAs). In some implementations, the PLC may be glass-based PLC. Silicon photonics circuitry may include silicon nitride circuitry (e.g., $Si_3N_4$ based circuitry). In some implementations, the seed device may include at least one of III-V semiconductor circuitry or micro-optics circuitry. In some implementations, the seed device may be a chip or integrated circuit including at least one of III-V semiconductor circuitry or micro-optics circuitry. In some implementations, the plurality of TX amplifiers may include at least one of III-V semiconductor circuitry or micro-optics circuitry. In some implementations, the plurality of TX amplifiers may include a chip or integrated circuit including at least one of III-V semiconductor circuitry or micro-optics circuitry.

In some implementations, the TX/RX/optics device of the lidar sensor system may include one or more transceivers (e.g., M×N transceivers each transmitting/receiving a single optical signal), one or more optical mixers, one or more photo-detectors, one or more optics devices (e.g., collimator), and/or one or more laser scanners (e.g., Galvo scanner, polygon scanner, etc.). Each of the one or more transceivers may be a monostatic transceiver, or a bistatic transceiver including TX waveguide (or antenna) and RX waveguide (or antenna). The one or more optics device may include one or more collimators configured to narrow/limit a plurality of optical signals (e.g., 16 light beams). The one or more optical mixers may optically mix one or more returned optical signals with an LO signal received from the seed device, to generate one or more mixed optical signals. The one or more photo-detectors may receive the one or more mixed optical signals to generate one or more electrical signals. The one or more laser scanners may be controlled by the lidar processing device (e.g., using software drivers).

In some implementations, the TX/RX/optics device may include at least one of silicon photonics circuitry, PLC, III-V semiconductor circuitry, or micro-optics circuitry. In some implementations, one or more transceivers of the TX/RX/optics device may include at least one of silicon photonics circuitry or PLC. In some implementations, the one or more transceivers may be a chip or integrated circuit including at least one of silicon photonics circuitry or PLC.

In some implementations, the lidar processing device of the lidar sensor system (as a second device) may include one or more ADCs or a multi-channel ADC (e.g., 16 ADCs or 16-channel ADC) configured to generate one or more digital signals based on one or more returned optical signals, and provide the digital signals to an autonomous vehicle control system. The lidar processing device may include one or more amplifiers, and/or one or more digital-to-analog converters (DACs). The lidar processing device may be a computing system (e.g., computing system 1000 in FIG. 10) that can execute software modules stored in a memory. For example, the lidar processing device may store software drivers to control the one or more scanners of the TX/RX/optics device (e.g., Galvo scanner, polygon scanner, etc.).

In some implementations, the lidar processing device may include a radio-frequency (RF) chip (or integrated circuit) implementing one or more ADCs, one or more amplifiers, and/or one or more DACs. The RF chip may be an RF system-on-chip (RF SoC). The RF chip may be an RF system-on-chip field-programmable gate array (FR SoC FPGA). In some implementations, the RF chip may include one or more radio frequency analog to digital converters (RF-ADCs), one or more radio frequency digital to analog converters (RF-DACs). In some implementations, the RF-ADCs and the RF-DACs may be configured in pairs for real and imaginary in-phase/quadrature (I/Q) data. For example, the lidar processing device may provide 2-channel RF signals (e.g., I/Q data) to the seed device for modulation (e.g., I/Q modulation). The RF chip may communicate with a vehicle or a vehicle control system (e.g., autonomous vehicle control system) through a Gigabit Ethernet (GigE) interface. In some implementations, the lidar processing device may include a functional safety (FuSa) system which is implemented as circuitry or software in the lidar processing device.

According to certain aspects, implementations in the present disclosure relate to a device a light detection and ranging (lidar) system including a transceiver, a first device including a laser source configured to generate a beam, and one or more optical components, a second device including one or more analog-to-digital converters (ADCs), and a processor configured to alternately turn on the first device and turn on the transceiver. The first device may generate, based on the beam, an optical signal associated with a local oscillator (LO) signal. The transceiver may transmit the optical signal to an environment, in response to transmitting the optical signal, receive a returned optical signal that is reflected from an object in the environment, and pair the returned optical signal with the LO signal to generate an electrical signal. The second device may generate, based on the electrical signal, a digital signal.

In some implementations, the processor may be configured to periodically turn on the first device with a first duty cycle and turn on the transceiver with a second duty cycle.

In some implementations, the transceiver includes at least one of silicon photonics circuitry, photonic lightwave circuit (PLC), or III-V semiconductor circuitry. In some implementations, the first device includes at least one of silicon photonics circuitry, PLC, or III-V semiconductor circuitry. In some implementations, the second device includes at least one of silicon photonics circuitry, PLC, or III-V semiconductor circuitry.

In some implementations, the transceiver may have a first group of N transmit (TX) channels, a second group of N TX channels, and 2N receive (RX) channels, wherein N is an integer. The second device may have 2N channels. N may be greater than or equal to 8. For example, N may be in the range from 8 to 16, inclusive.

In some implementations, the first device may be configured to generate a first optical signal associated with a first LO signal. In response to the first device generating the first optical signal, the transceiver may be configured to transmit the first optical signal to the environment through the first group of N TX channels. In response to the transceiver transmitting the first optical signal, the first device may be configured to generate a second optical signal associated with a second LO signal. In response to the first device generating the second optical signal, the transceiver may be configured to transmit the second optical signal to the environment through the second group of N TX channels.

In some implementations, in response to turning on the first device, the first device may be configured to selectively provide the optical signal to one of the first group of N TX channels or the second group of N TX channels. In response to turning on the transceiver, the transceiver may be configured to transmit the optical signal to the environment through the one of the first group of N TX channels or the second group of N TX channels, receive, through the 2N RX channels, the returned optical signal, and pair the returned optical signal with the LO signal to generate the electrical signal. The second device may be configured to generate, based on the electrical signal through the 2N channels of the second device, the digital signal.

In some implementations, the lidar system may further include a plurality of optical amplifiers configured to provide amplified optical signals to the first group of N TX channels. The number of the plurality of optical amplifiers may be less than N. The plurality of optical amplifiers may include one or more tapered optical amplifiers (TPAs). The one or more TPAs may contain a tapered section in which a cross-section area of an amplified beam is gradually increased. The one or more TPAs may be one or more tapered semiconductor optical amplifiers (SOAs).

In some implementations, the first device may be configured to provide, based on the beam, a seed optical signal to the plurality of optical amplifiers. The lidar system may further include a splitter. The first device may be configured to provide the seed optical signal to the plurality of optical amplifiers through the splitter. The splitter may be coupled to an input side of an optical amplifier using one of butt coupling or lens coupling.

In some implementations, the transceiver may be an integrated circuit including at least one of silicon photonics circuitry, PLC, or III-V semiconductor circuitry. In some implementations, the transceiver may include a transmitter device and a receiver device. One of the transmitter device or the receiver device is an integrated circuit including at least one of silicon photonics circuitry, PLC, or III-V semiconductor circuitry.

According to certain aspects, implementations in the present disclosure relate to an autonomous vehicle control system including one or more processors, and one or more computer-readable storage mediums storing instructions which, when executed by the one or more processors, cause the one or more processors to alternately turn on the first device and turn on the transceiver. The first device may include a laser source configured to generate a beam, and one or more optical components. The instructions may cause the first device to generate, based on the beam, an optical signal associated with a local oscillator (LO) signal. The instructions may cause the transceiver to transmit the optical signal to an environment, and in response to transmitting the optical signal, receive a returned optical signal that is reflected from an object in the environment, and pair the returned optical signal with the LO signal to generate an electrical signal. The instructions may cause a second device to generate, based on the electrical signal, a digital signal. The second device may include one or more analog-to-digital converters (ADCs). The instructions may control operation of a vehicle using the digital signal.

According to certain aspects, implementations in the present disclosure relate to an autonomous vehicle including at least one of a steering system or a braking system, and a vehicle controller including one or more processors. The one or more processors may be configured to alternately turn on the first device and turn on the transceiver. The first device may include a laser source configured to generate a beam, and one or more optical components. The one or more processors may be configured to cause the first device to generate, based on the beam, an optical signal associated with a local oscillator (LO) signal. The one or more processors may be configured to cause a transceiver to transmit the optical signal to an environment, and in response to transmitting the optical signal, receive a returned optical signal that is reflected from an object in the environment, pair the returned optical signal with the LO signal to generate an electrical signal. The one or more processors may be configured to cause a second device to generate, based on the electrical signal, a digital signal. The second device may include one or more analog-to-digital converters (ADCs). The one or more processors may be configured to control the at least one of the steering system or the braking system using the digital signal.

Various implementations in the present disclosure have one or more of the following advantages and benefits.

First, implementations in the present disclosure can provide useful techniques for efficiently using limited or expensive hardware resources (e.g., receive (RX)-side hardware resources such as analog-to-digital converters (ADCs)). In some implementations, a lidar sensor system may be configured to generate and transmit M×N optical signals (e.g., $M \geq 2$, $N \geq 8$) by alternately turning on the photonics module and turning on a TX/RX/optics device (or a set of N transceivers thereof) M times (e.g., by temporally multiplexing M sets of N transceivers) to transmit M×N optical signals to an environment. In response to transmitting the optical signals, a plurality of sets of transceivers (e.g., M×N transceivers) may receive returned signals in M×N channels, and the lidar processing device may then process the returned optical signals in M×N channels. In this manner, the lidar processing device (e.g., ADCs) can be efficiently shared among the plurality of sets of transceivers (e.g., M sets of N transceivers).

Second, implementations in the present disclosure can provide useful techniques for providing a chip-scale package solution to efficiently share such limited hardware resources among other circuit modules. In some implementations, a lidar sensor system may include a seed device implemented in a chip or integrated circuit ("seed device chip") including at least one of III-V semiconductor circuitry or micro-optics circuitry. The lidar system may also include a plurality of transceivers implemented in a chip or integrated circuit ("transceiver chip") including at least one of silicon photonics circuitry or PLC. In a manner similar to that described above, the seed device chip and the transceiver chip may be alternately turned on M times to temporally multiplex M sets of N transceivers in the transceiver chip, thereby transmitting M×N optical signals to an environment. In response to transmitting the optical signals, the transceiver chip may receive returned signals in M×N channels, and the lidar processing device may then process the returned optical signals in M×N channels. In this manner, the lidar processing device (e.g., ADCs) can be efficiently shared among the plurality of sets of transceivers (e.g., M sets of N transceivers in the transceiver chip).

Third, implementations in the present disclosure can provide useful techniques for seeding multiple TX amplifiers with multiple apertures with one optical signal. In some implementations, the plurality of TX amplifiers may include, at input sides thereof, a plurality of apertures to which the seed device may provide a single optical signal. The seed device may provide a TX optical signal to the plurality of TX amplifiers through one or more splitters. The one or more splitters may be one or more fiber splitters. A splitter may be coupled to an input side of an optical amplifier using one of butt coupling or lens coupling. In this manner, the seed device can seed multiple TX amplifiers (e.g., tapered SOAs or a tapered SOA array) with multiple apertures with one optical signal.

FIG. 3A is a block diagram illustrating an example of a lidar sensor system according to some implementations. An environment 300 includes a lidar sensor system 301 that includes a processor 340, a photonics module 303 (or photonics device), a TX/RX/optics device 307, and a lidar processing device 305. The processor 340 may have configuration similar to that of processor 1010 in FIG. 10.

In some implementations, the photonics module 303 may include a laser source 302, a modulator 304A, a modulator 304B and an amplifier 306. The laser source 302 may be configured to generate a light signal (or beam). The laser source 302 may be configured to provide the light signal to the modulator 304A, which is configured to modulate a phase and/or a frequency of the light signal based on a first radio frequency (RF) signal (shown in FIG. 3 as, "RF3") and using Continuous Wave (CW) modulation or quasi-CW modulation to generate a modulated light signal. In some implementations, the photonics module 303 may be configured to receive the RF signal RF3 from the lidar processing device 305 through a communication interface 309. The modulator 304A may be configured to send the modulated light signal (e.g., TX optical signal) to the amplifier 306. In some implementations, the amplifier 306 may include a plurality of amplifiers configured to receive the TX optical signal through one or more splitters (not shown in FIG. 3A). Each of the plurality of amplifiers may be configured to amplify the TX optical signal to generate an amplified TX optical signal, and provide, based on the amplified TX optical signal through a splitter (not shown in FIG. 3A), a plurality of amplified TX optical signals to the TX/RX/optics device 307. In this manner, the amplifier 306 may provide N amplified TX optical signals to the TX/RX/optics device 307.

In some implementations, the laser source 302 may be configured to provide an LO signal to the modulator 204B, which is configured to modulate a phase and/or a frequency of the LO signal based on a second RF signal (shown in FIG. 3A as, "RF4") and using Continuous Wave (CW) modulation or quasi-CW modulation to generate a modulated LO signal and send the modulated LO signal to a mixer (e.g., 308-1, ..., 308-M) of the the TX/RX/optics device 307. In some implementations, the photonics module 303 may be configured to receive the RF signal RF4 from the lidar processing device 305 through the communication interface 309.

In some implementations, the TX/RX/optics device 307 may include a plurality of N-channel transceivers 307-1, ..., 307-M (e.g., M number of N-channel transceivers; M, N are integers), and one or more optics 310. In some implementations, each N-channel transceiver may include N transceivers each transmitting/receiving a single optical signal. Each transceiver may be a monostatic transceiver or a bistatic transceiver. Each N-channel transceiver (e.g., 307-1) may include an N-channel transmitter (e.g., transmitter 320-1 which may include N single-channel transmitters), an N-channel receiver (e.g., receiver 322-1 which may include N single-channel receivers), an N-channel mixer (e.g., mixer 308-1 which may include N single-channel mixer), and an N-channel photo-detector (e.g., detector 312-1 which may include N single-channel photodetectors).

In some implementations, the processor 340 of the lidar sensor system may alternately turn on the photonics module 303 and turn on the TX/RX/optics device 307 (or an N-channel transceivers thereof) M times during a period using control signals 343, 347 to transmit M×N TX optical signals to an environment. The processor 340 of the lidar sensor system may turn on the photonics module 303 with a first duty cycle and turn on the TX/RX/optics device 307 (or an N-channel transceivers thereof) with a second duty cycle during a period using control signals 343, 347 to transmit M×N TX optical signals to an environment. The processor 340 may temporally multiplex M number of N-channel transceiver using the control signals 343, 347 so that a (selected) N-channel transceiver may transmit N TX optical signals to the environment at M different time during a period. The processor 340 may determine a sequence of M number of N-channel transceivers and perform time sequencing according to the determined sequence so that each of M number of N-channel transceivers may transmit N TX optical signals to the environment, according to the sequence at M different times during the period. In some implementations, the lidar sensor system may be configured to generate and provide M×N LO signals to the TX/RX/optics device, similarly. For example, the processor may (1) temporally multiplex M number of N-channel transceivers so that a (selected) N-channel transceiver may receive N LO signals at M different time during a period, or (2) determine a sequence of M number of N-channel transceivers and perform time sequencing according to the sequence so that each of M number of N-channel transceivers may receive N LO signals, according to the sequence at M different times during the period. In some implementations, the photonics module 303 may provide the same LO signal to the M number of N-channel transceivers.

In some implementations, the TX/RX/optics device 307 may include one or more optics 310 (e.g., an oscillatory scanner, a unidirectional scanner, a Risley prism, a circulator optic, and/or a beam collimator, etc.) that are coupled to the transceivers 307-1, ..., 307-M. In some implementations, the one or more optics 210 may be coupled to the transmitters 320-1, ..., 320-M through corresponding Tx input/output ports. In some implementations, the one or more optics 210 may be coupled to the receivers 322-1, ..., 322-M through corresponding Rx input/output ports.

In some implementations, the optics 310 may (1) receive N amplified optical signals generated by an N-channel transmitter (e.g., 320-1) and (2) transmit or steer the N received amplified optical signals into an environment. The optics 310 may repeat the transmission of N amplified optical signals M times (e.g., transmissions by transmitters 320-1, 320-2, ..., 320-M) during the period.

In some implementations, the optics 310 may receive a returned signal reflected back from one or more objects and provide the returned signal to a corresponding receiver (e.g., 322-1, ..., or 322-M). The returned signal may include N returned signals. A mixer (e.g., 308-1, ..., or 308-M) corresponding to the receiver (e.g., mixer in the same transceiver) may (1) receive the returned signal through the receiver, (2) receive an LO signal from the photonics module 303, (3) optically mix (e.g., combine, multiply, etc.) the returned signal and LO signal, (4) generate down-converted signal and send the down-converted signal to a detector (e.g., 312-1, ..., or 312-M) corresponding to the mixer (e.g., detector in the same transceiver) to generate a mixed signal. The detector (e.g., 312-1) may (1) receive the mixed signal, (2) generate, based on the mixed signal, an electrical signal, and (3) send the electrical signal to the lidar processing device 305. The electrical signal may include N electrical signals.

In some implementations, the lidar processing device 305 may include one or more amplifiers 314, one or more ADCs or a multi-channel ADC 324 (e.g., 16 ADCs or 16-channel ADC) configured to generate one or more digital signals based on one or more electrical signals received from the TX/RX/optics device 307, and provide the digital signals to an autonomous vehicle control system.

In some implementations, the processor 340 may temporally multiplex M number of N-channel transceiver (e.g., transceivers 307-1, ..., 307-M) so that a (selected) N-channel transceiver may transmit N TX optical signals to the environment at M different time during a period.

In some implementations, the modulator 304A may be configured to send a first modulated light (optical) signal and a second modulated light (optical) signal to the amplifier 306. The amplifier 306 may be configured to amplify the first modulated light signal to generate first N amplified TX light signals to a first transceiver of the M transceivers 307-1, 307-2, . . . , 307-M. Similarly, the amplifier 306 may be configured to amplify the second modulated light signal to generate second N amplified TX light signals to a second transceiver of the M transceivers.

The modulator 304B may be configured to generate a first modulated LO signal associated with the first modulated light signal, and send the first modulated LO signal to a mixer of the first transceiver. Similarly, the modulator 304B may be configured to generate a second modulated LO signal associated with the second modulated light signal, and send the second modulated LO signal to a mixer of the second transceiver.

The optics 310 may be configured to steer the first N amplified TX light signals that it receives from the amplifier 306 into an environment within a given field of view toward the object 318. Similarly, the optics 310 may be configured to steer the second N amplified TX light signals that it receives from the amplifier 306 into the environment within a given field of view toward the object 318.

In some implementations, the optics 310 may receive a first returned signal (e.g., N returned signals) reflected back from the object 318 and provide the first returned signal to an RX path of the first transceiver including a receiver, a mixer, and a detector. The mixer of the first transceiver may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector of the first transceiver. The detector of the first transceiver may generate a first electrical signal (e.g., N electrical signals), and send the first electrical signal to the lidar processing device 305.

Similarly, the optics 310 may receive a second returned signal (e.g., N returned signals) reflected back from the object 318 and provide the second returned signal to an RX path of the second transceiver including a receiver, a mixer, and a detector. The mixer of the second transceiver may be configured to pair (e.g., associate, link, identify, etc.) the second returned light signal and the second modulated LO signal, and mix (e.g., combine, multiply, etc.) the second returned light signal and the second modulated LO signal to generate a second down-converted signal and send the second down-converted signal to the detector of the second transceiver. The detector of the second transceiver may generate a second electrical signal (e.g., N electrical signals), and send the second electrical signal to the lidar processing device 305.

In some implementations, the one or more ADCs 324 of the lidar processing device 305 may be configured to generate first and second digital signals based on the first and second electrical signals received from the TX/RX/optics device 307 through the one or more amplifiers 314, and provide the first and second digital signals to the autonomous vehicle control system 120. The vehicle control system 120 may be configured to determine a distance to the object 318 and/or measures the velocity of the object 318 based on the first and second digital signals.

FIG. 3B is a block diagram illustrating another example of a lidar sensor system according to some implementations.

Referring to FIG. 3B, a lidar sensor system 350 (e.g., FMCW or other coherent lidar sensor systems) may include a processor 390, a photonics module 380 (e.g., photonics device or photonics assembly) as a first device, a lidar processing device 370 (e.g., lidar computation assembly) as a second device which includes one or more ADCs 373, and a transmit (TX)/receive (RX)/optics device 360 (e.g., free space optics assembly) including a plurality of sets of transceivers. In some implementations, the plurality of sets of transceivers may include (1) M sets of N single-channel transceivers where M and N are integers, or (2) M number of N-channel transceiver (e.g., 367-1, . . . , 367-M).

In some implementations, the lidar sensor system 350 may be configured to generate and transmit M×N optical signals (e.g., M≥2, N≥8) by (1) alternately turning on the photonics module 380 and turning on the TX/RX/optics device 360 (or a set of N transceivers thereof) M times or (2) temporally multiplexing M sets of N transceivers, thereby transmitting M×N optical signals to an environment. In response to transmitting the optical signals, the plurality of sets of transceivers (e.g., M sets of N single-channel transceiver or M number of N-channel transceiver) may receive returned signals in M×N channels, and the lidar processing device 350 may then process the returned optical signals in M×N channels. In this manner, the lidar processing device 370 (or ADCs 373) can be efficiently shared among the plurality of sets of transceivers (e.g., M sets of N single-channel transceiver or M number of N-channel transceiver).

In some implementations, the lidar sensor system 350 may be configured to generate M×N optical signals and transmit them to the environment substantially at the same time (when M=1; e.g., without multiplexing M sets of N transceivers), and receive returned optical signals (e.g., optical signals returned from an object) and process the returned optical signals in N channels substantially at the same time. For example, when M=1, the photonics module 380 may generate N TX beams, provide the N TX beams and an LO signal to a transceiver device (or module) which may be N single-channel transceivers or an N-channel transceiver. The transceiver device may transmit N TX beams to the environment, receive returned optical signals in N RX channels as N RX optical signals, perform mixing and photo-detection on the N RX optical signals using the LO signal, and provide N electrical signals to the lidar processing device 370. The lidar processing device 370 may process the N electrical signals using a plurality of ADCs 373 (e.g., N number of ADCs). In this manner, the lidar sensor system 350 may process N optical signals substantially at the same time. For example, the lidar sensor system may process 16 optical signals (M=1 and N=16) substantially at the same time.

In some implementations, when M≥2, the lidar sensor system 350 may be configured to generate N optical signals and transmit them to the environment at M different times during a period by temporally multiplexing M sets of N transceivers (e.g., 367-1, . . . , 367-M), and receive returned optical signals (e.g., optical signals returned from an object) and process the returned optical signals in M×N channels. For example, when M=2, during a period, the photonics module 380 may generate N TX beams, provide the N TX beams and an LO signal to a transceiver device (or module) including N transceivers, twice (or at two different times), so that the 2N transceivers in total can transmit 2N TX beams to the environment during the period. In some implementations, during the period, the photonics module 380 and one of two (2) sets of N transceivers (e.g., 367-1 or 367-2) can be alternately turned on twice (or at two different times) to thereby transmit 2N TX beams to the environment. For example, during the period, (1) the photonics module 380 may be turned on to generate a first set of N optical signals, (2) a first set of N transceivers (e.g., 367-1) may be turned on to transmit the first set of N optical signals to the environment, (3) the photonics module 380 may be turned on to generate a second set of N optical signals, and (4) a second set of N transceivers (e.g., 367-2) may be turned on to transmit the second set of N optical signals to the environment. The 2N transceivers (e.g., 367-1 and 367-2) may receive returned optical signals in 2N RX channels as 2N RX optical signals, perform mixing and photo-detection on the 2N RX optical signals using the LO signal, and provide 2N electrical signals to the lidar processing device 370 including a plurality of ADCs 373 (e.g., 2N ADCs). The lidar processing device 370 may process the 2N electrical signals using the ADCs 373. In this manner, the lidar processing device or ADCs can be efficiently shared among a first set of N transceivers and a second set of N transceivers. For example, the lidar sensor system may process 16 optical signals (M=2, N=8) by efficiently sharing ADCs 373 among a first set of 8 transceivers (e.g., 367-1) and a second set of 8 transceivers (e.g., 367-2).

In some implementations, the processor 390 may control the photonics module 380 to generate and provide N TX optical signals to the TX/RX/optics device at M different times during a period. The processor 390 may temporally multiplex M number of N-channel transceivers (e.g., 367-1, . . . , 367-M) so that a (selected) N-channel transceivers may transmit N TX optical signals to the environment at M different time during the period. The processor 390 may determine a sequence of M number of N-channel transceivers and perform time sequencing according to the determined sequence so that each of M number of N-channel transceivers may transmit N TX optical signals to the environment, according to the sequence at M different times during the period. The processor 390 may perform the temporal multiplexing or time sequencing using (1) a control signal 393 input to the photonics module 380 and (2) a control signal 391 input to the TX/RX/optics device 360.

In some implementations, the lidar sensor system may be configured to generate and provide M×N LO signals to the TX/RX/optics device, similarly. For example, the processor 390 may control the photonics module 380 to generate and provide N LO signals to the TX/RX/optics device at M different times during a period. The processor may (1) temporally multiplex M sets of N transceivers so that a (selected) N-channel transceiver may receive N LO signals at M different time during the period, or (2) determine a sequence of M number of N-channel transceivers and perform time sequencing according to the sequence so that each of M number of N-channel transceivers may receive N LO signals, according to the sequence at M different times during the period. The processor 390 may perform the temporal multiplexing or time sequencing for LO signals using a control signal input to the photonics module 380 and a control signal input to the TX/RX/optics device 360.

In some implementations, the photonics module 380 (as a first device) may include a laser source 380, a seed device 382 (e.g., photonics seed module), and a plurality of TX amplifiers 384 (e.g., photonics TX amplifier module). The laser source 380 may be a laser diode (e.g., Distributed Feedback (DFB) laser diode). The laser source may generate laser having a wavelength in a range between 1530 nm and 1565 nm.

In some implementations, the seed device 382 may include an input optical path, a first optical path, a plurality of second optical paths, a first optical amplifier, a plurality of second optical amplifiers, and a control circuit. The input optical path may be configured to receive, at one end thereof, a beam from the laser source. The first optical path and a plurality of second optical paths may be respectively branched from at the other end of the input optical path. The first optical amplifier may be coupled to the first optical path. The plurality of second optical amplifiers may be respectively coupled to the plurality of second optical paths. The control circuit may be configured to selectively turn on one of the plurality of second optical amplifiers to output a modulated optical signal of the beam as a TX optical signal. The control circuit may be configured to turn on the first optical amplifier to output a modulated optical signal of the beam as an LO signal. In this manner, the seed device 382 may generate, based on a light beam from the laser source 380, a TX optical signal and an LO signal, provide the TX optical signal to the one or more TX amplifiers 384, and provide the LO signal 353 to one or more transceivers of the TX/RX/optics device (e.g., transceivers 367-1, . . . , 367-M). In some implementations, the seed device 382 may provide the LO signal 353 to the one or more transceivers through one or more multi-fiber push on (MPO) connectors 388.

Each of the plurality of TX amplifiers 384 may receive a TX optical signal and output an amplified TX optical signal to one or more transceivers of the TX/RX/optics device. In some implementations, each TX amplifier may provide, based on the amplified TX optical signals through a splitter, a plurality of amplified TX optical signals 351 to the one or more transceivers. In some implementations, one or more amplified TX optical signals may be output to the one or more transceivers through MPO connectors 386 (e.g., 16 fibers for 16 TX optical signals).

In some implementations, the plurality of TX amplifiers 384 may include a plurality of optical amplifiers. The optical amplifiers may include one or more semiconductor optical amplifiers (SOAs), one or more fiber Raman and Brillouin amplifiers, or one or more erbium-doped fiber amplifiers (EDFAs). For example, the one or more SOAs may have an input power in the range of 1 mW to 20 mW. the plurality of TX amplifiers may include one or more EDFA with an input power level in the range of 0.1 mW to 1 mW. In some implementations, the plurality of TX amplifiers 384 may include an array of optical amplifiers. The optical amplifiers may include an SOA array, an array of fiber Raman and Brillouin amplifiers, or an EDFA array.

In some implementations, the plurality of TX amplifiers 384 may include a plurality of tapered optical amplifiers (TPAs), each containing a tapered section in which a cross-section area of an amplified beam is gradually increased. The plurality of TPAs may include one or more of tapered SOA, tapered fiber Raman and Brillouin amplifier, or tapered EDFA. The plurality of TPAs may include one or more of a tapered SOA array, an array of tapered fiber Raman and Brillouin amplifier, or a tapered EDFA array.

In some implementations, the TX/RX/optics device 360 may include one or more transceivers (e.g., M number of N-channel transceivers 367-1, . . . , 367-M each transmitting/receiving N optical signals), one or more optical mixers (not shown), one or more photo-detectors (not shown), one or more optics devices (e.g., collimator 364), and/or one or more laser scanners (e.g., Galvo scanner 366, polygon scanner 368, etc.). Each of the one or more transceivers may be a monostatic transceiver, or a bistatic transceiver including TX waveguide (or antenna) and RX waveguide (or antenna). In some implementations, each of the one or more transceivers may also include an optical mixer and a photo-detector. The one or more optics device may include one or more collimators 364 configured to narrow/limit a plurality of optical signals (e.g., 16 light beams). The one or more optical mixers may optically mix one or more returned optical signals with an LO signal 353 received from the seed device 382, to generate one or more mixed optical signals. The one or more photo-detectors may receive the one or more mixed optical signals to generate one or more electrical signals. The one or more laser scanners 366, 368 may be controlled by the lidar processing device 370 (e.g., using software drivers).

In some implementations, the lidar processing device 370 (as a second device) may include one or more ADCs 373 or a multi-channel ADC (e.g., 16 ADCs or 16-channel ADC) configured to generate one or more digital signals based on one or more returned optical signals, and provide the digital signals to an autonomous vehicle control system. The ADCs 373 may receive one or more electrical signals (e.g., M×N electrical signals 355) from photo-detectors of the TX/RX/optics device 360 through RF connectors 372. The lidar processing device 370 may include one or more amplifiers 371, and/or one or more digital-to-analog converters (DACs) 375. The lidar processing device 370 may be a computing system having configuration similar to that of computing system 1000 in FIG. 10, and can execute software modules stored in a memory. For example, the lidar processing device 370 may store software drivers (e.g., Galvo driver 376, Polygon motor driver 378) to control the one or more scanners of the TX/RX/optics device (e.g., Galvo scanner 366, polygon scanner 368) through communication interfaces 357, 359.

In some implementations, the lidar processing device 370 may include a radio-frequency (RF) chip 374 (or integrated circuit) implementing one or more ADCs, one or more amplifiers, and/or one or more DACs. The RF chip 374 may be an RF system-on-chip (RF SoC). The RF chip 374 may be an RF system-on-chip field-programmable gate array (FR SoC FPGA). In some implementations, the RF chip 374 may include one or more radio frequency analog to digital converters (RF-ADCs), one or more radio frequency digital to analog converters (RF-DACs). In some implementations, the RF-ADCs and the RF-DACs may be configured in pairs for real and imaginary in-phase/quadrature (I/Q) data. For example, the lidar processing device 370 may provide 2-channel RF signals 377 (e.g., I/Q data) to the seed device 382 for modulation (e.g., I/Q modulation). The RF chip 374 may communicate with a vehicle or a vehicle control system (e.g., autonomous vehicle control system 120) through a Gigabit Ethernet (GigE) interface 395. In some implementations, the lidar processing device 370 may include a functional safety (FuSa) system which is implemented as circuitry or software in the lidar processing device.

Figure 4C:
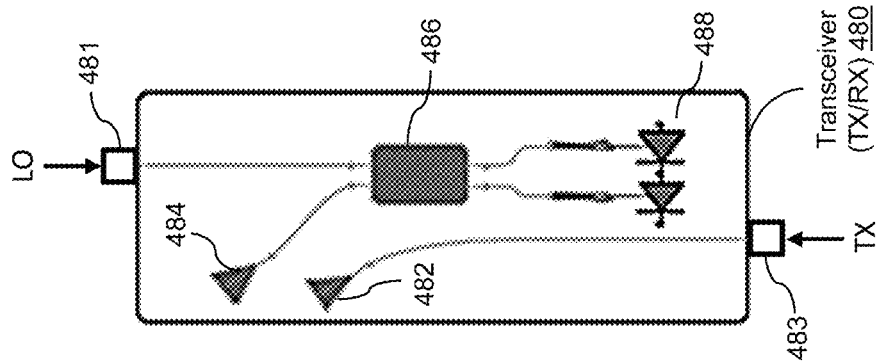
FIG. 4C is a diagram illustrating an example of a transceiver device according to some implementations.
Figure 4B:
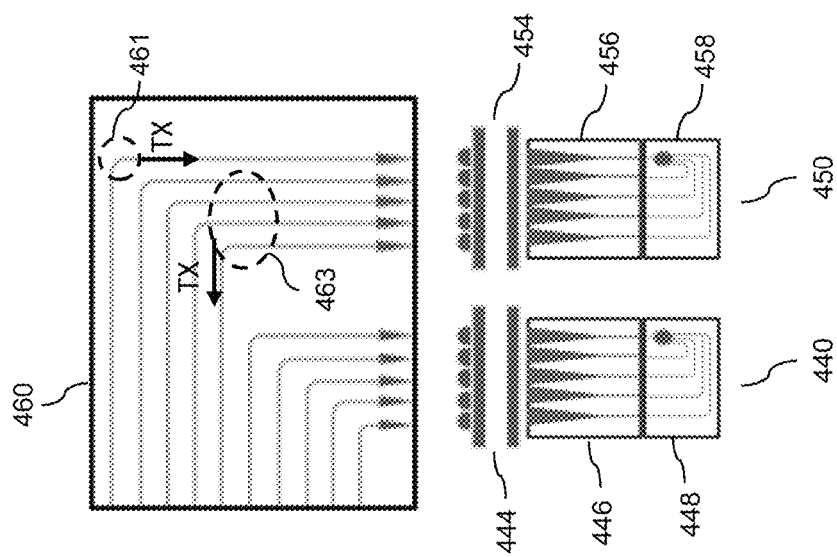
FIG. 4A and FIG. 4B are diagrams illustrating examples of transmit (TX) amplifiers according to some implementations.
Figure 4A:
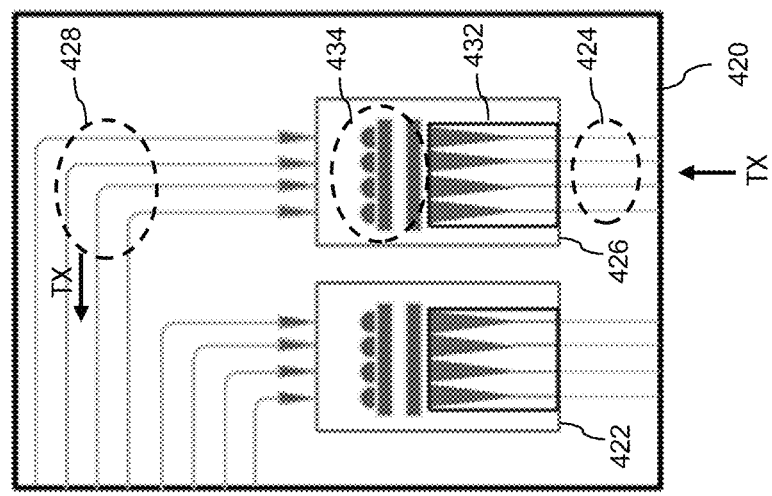

FIG. 4A and FIG. 4B are diagrams illustrating examples of transmit (TX) amplifiers according to some implementations.

Referring to FIG. 4A, a TX amplifier (e.g., TX amplifier 384 in FIG. 3B) may include a plurality of TX amplifiers 420. The plurality of TX amplifiers 420 may include chips 422, 426 each including an optical amplifier array. The chip 426 may include an array 432 of four tapered optical amplifiers and a plurality of lenses 434 coupled between the array 432 and corresponding waveguide circuits 428 (which may be connected to a plurality of transceivers). In some implementations, the lenses 434 may be coupled to the waveguide circuits 428 on either silicon photonics chip or other waveguide platform (e.g., PLC). Examples of the waveguide circuits 428 may include fiber cables or a fiber array implemented in silicon photonics circuitry. In some implementations, the chip 426 may include an array of solid state optical amplifiers. In some implementations, the number of the tapered optical amplifiers in the array 432 may be in the rage of 2 to 6. The array 432 may include, at input sides thereof, a plurality of apertures (not shown) to which a seed device (e.g., seed device 382) may provide an optical signal (e.g., TX optical signal). The seed device may generate, based on a single TX optical signal, a plurality of TX optical signals using one or more splitters (not shown in FIG. 4A), and provide the plurality of TX optical signals to the array 432 through fiber cables 424. The one or more splitters may be one or more fiber splitters. A splitter may be coupled to an input side of an optical amplifier using one of butt coupling or lens coupling. For example, in butt coupling, an input side of an optical amplifier may be facing directly towards an output terminal (e.g., waveguide ends) of the seed device. In lens coupling, an input side of an optical amplifier and an output terminal of the seed device may be coupled using lens, e.g., ball lens. In this manner, the seed device can seed multiple TX amplifiers (e.g., arrays 422, 424) with multiple apertures with one TX optical signal.

Referring to FIG. 4A, in some implementations, the fiber cables 424, 428 (or fiber arrays) may be implemented in silicon photonics circuitry (e.g., silicon nitride ($Si_3N_4$)-based circuitry). The array 432 of tapered optical amplifiers (e.g., tapered SOAs) may be implemented in III-V semiconductor circuitry. The plurality of lenses 434 may be implemented in micro-optics circuitry.

Referring to FIG. 4B, a TX amplifier (e.g., TX amplifier 384 in FIG. 3B) may include U-turn chips 440, 450 and fiber cables 460. The U-turn chip 440 may include a plurality of lenses 444, an array 446 of five (5) tapered optical amplifiers (TPAs), and input wirings 448. Similarly, the U-turn chip 450 may include a plurality of lenses 454, an array 456 of five (5) TPAs (referred to as first-to-five TPAs from right to left), and input wirings 458. In the input wirings 448, 458, an input side of the first TPA (e.g., the rightmost TPA) may be coupled to input sides of the second-to-fifth TPAs (e.g., the remaining 4 TPAs). With this configuration, a TX optical signal 461 received at the first TPA through a corresponding lens 454 may be provided to the input sides of the second-to-fifth TPAs so that the second-to-fifth TPAs may output four (4) amplified TX optical signals through the corresponding lenses 454 to four (4) waveguide circuits 463. Examples of the waveguide circuits 463 may include fiber cables or a fiber array implemented in silicon photonics circuitry.

Referring to FIG. 4B, in some implementations, the waveguide circuits 460 may be fiber cables or a fiber array implemented in silicon photonics circuitry (e.g., silicon nitride ($Si_3N_4$)-based circuitry). The TPA arrays 446, 456 may be implemented in III-V semiconductor circuitry. The plurality of lenses 444, 454 may be implemented in micro-optics circuitry.

FIG. 4C is a diagram illustrating an example of a transceiver device according to some implementations.

Referring to FIG. 4C, a single-channel transceiver 480 which can transmit/receive a single optical signal, may include a transmitter (or TX waveguide or antenna) 482, a receiver (or RX waveguide or antenna) 484, an optical mixer 486, a photo-detector 488, a TX input terminal 483, and an LO input terminal 481. The transmitter 482 may transmit a TX optical signal received at the TX input terminal 483 to an environment. The receiver 484 may receive a returned signal reflected back from an object, and provided the returned signal to the optical mixer 486. The optical mixer may receive an LO signal (from a seed device) at the LO input terminal 481, and optically mix the returned optical signals with the LO signal, to generate a mixed optical signal. The photo-detector 488 may receive the mixed optical signal to generate an electrical signal to be output to a lidar processing device (e.g., lidar processing device 370).

Referring to FIG. 4C, in some implementations, the transceiver 480 (and transmitter 482, receiver 484, optical mixer 486, photo-detector 488, LO input terminal 481, and TX input terminal 483, thereof) may be implemented in silicon photonics circuitry including silicon nitride ($Si_3N_4$)-based circuitry. In some implementations, the transceiver 480 may be implemented in a chip or integrated circuit including silicon photonics circuitry. In some implementations, the photo-detector 488 may be implemented in silicon photonics circuitry or monolithically integrated with PLC.

Figure 5:
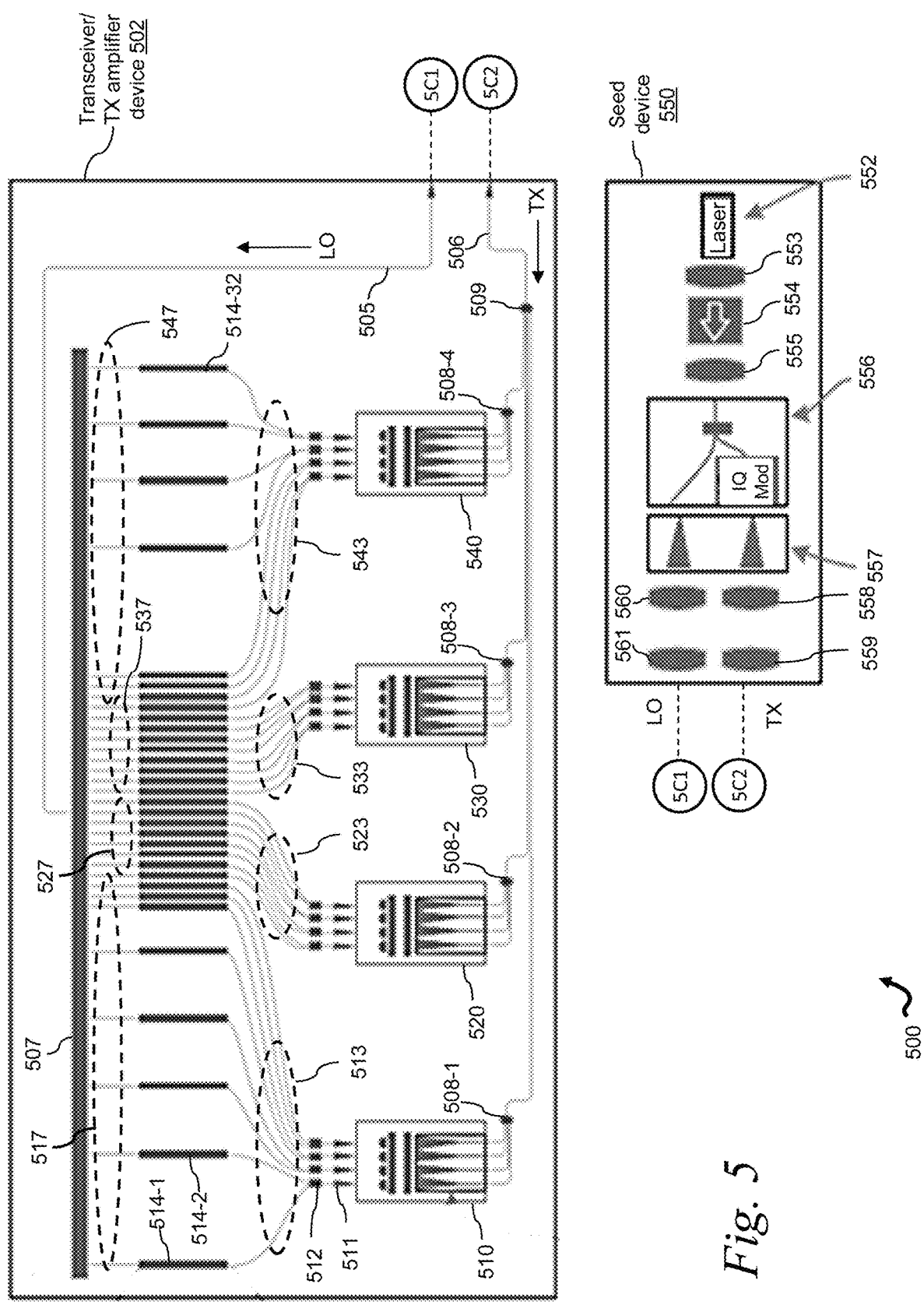
FIG. 5 is a diagram illustrating an example of a lidar system according to some implementations.

FIG. 5 is a diagram illustrating an example of a lidar sensor system according to some implementations.

Referring to FIG. 5, a lidar sensor system 500 may include a seed device 550 and a transceiver/TX amplifier device 502. In some implementations, the seed device 550 may include a laser source 552, a first set of optics including lens 553, an optical isolator 554, lens 555, a modulator 556 (e.g., I/Q modulator), a pair of tapered optical amplifiers (TPAs) 557, a second set of optics including lenses 558, 559, and a third set of optics including lenses 560, 561. The first set of optics may form a common optical path. An upper TPA in the pair 557 and the second set of optics may form an LO optical path, while a lower TPA in the pair 557 and the third set of optics may form a TX optical path. With this configuration, the seed device 550 may generate, based on a light beam from the laser source 552, an LO signal through the common optical path and the LO optical path, and provide the LO optical signal to an LO input path 505 of the transceiver/TX amplifier device 502. The seed device 550 may generate, based on a light beam from the laser source 552, a TX optical signal through the common optical path and the TX optical path, and provide the TX optical signal to a TX input path 506 of the transceiver/TX amplifier device 502.

In some implementations, the transceiver/TX amplifier device 502 may include a plurality of TX amplifier arrays 510, 520, 530, 540. Each of the plurality of TX amplifier arrays 510, 520, 530, 540 may be implemented in a chip which has configuration similar to that of the chip 426 in FIG. 4A. Each TX amplifier array may include, at input sides thereof, a plurality of apertures (not shown) to which a TX optical signal generated by the seed device 550 may be provided. The TX optical signal generated by the seed device 550 may be provided to the plurality of TX amplifier arrays through one or more splitters 508-1, 508-2, 508-3, 508-4, 509. The one or more splitters may be one or more fiber splitters. A splitter may be coupled to an input side of an optical amplifier using one of butt coupling or lens coupling. For example, in butt coupling, an input side of an optical amplifier may be facing directly towards an output terminal (e.g., waveguide ends) of the seed device. In lens coupling, an input side of an optical amplifier and an output terminal of the seed device may be coupled using lens, e.g., ball lens. In this manner, the seed device can seed multiple TX amplifiers (e.g., tapered SOAs or a tapered SOA array) with multiple apertures with one optical signal.

In some implementations, the transceiver/TX amplifier device 502 may include a plurality of transceivers 514-1, 514-2, ..., 514-32. Each of the plurality of transceivers may have configuration similar to that of the single-channel transceiver 480 in FIG. 4C. The plurality of TX amplifier arrays 510, 520, 530, 540 may output amplified TX optical signals to respective TX input terminals of the plurality of transceivers through waveguide circuits (e.g., waveguide circuits 511), a plurality of splitters (e.g., splitter 512), and a plurality of split TX optical paths 513, 523, 533, 543. Examples of the waveguide circuits 511 may include fiber cables or a fiber array implemented in silicon photonics circuitry. For example, as shown in FIG. 5, the plurality of transceivers may include four (4) sets of eight (8) transceivers (M=4, N=8). With this configuration, a processor (e.g., processor 340 in FIG. 3B) of the lidar sensor system may alternately turn on the seed device 550 and turn on the transceiver/TX amplifier device 502 M times during a period to transmit M×N TX optical signals to an environment. The processor may turn on the seed device 550 with a first duty cycle and turn on the transceiver/TX amplifier device 502 with a second duty cycle during the period to transmit M×N TX optical signals to the environment. The processor may temporally multiplex M sets of N transceivers so that a (selected) set of N transceivers may transmit N TX optical signals to the environment at M different time during the period. The processor may determine a sequence of M sets of N transceivers and perform time sequencing according to the determined sequence so that each of M sets of N transceivers may transmit N TX optical signals to the environment, according to the sequence at M different times during the period.

In some implementations, the LO signal generated by the seed device may be provided to respective LO input terminals of the plurality of transceivers 514-1, 514-2, ..., 514-32 through a splitter (e.g., splitter 507) and a plurality of split optical LO paths 517, 527, 537, 547. With this configuration, the lidar sensor system 500 may be configured to generate and provide M×N LO signals to the plurality of transceivers. For example, the processor may (1) temporally multiplex M sets of N transceivers so that a (selected) set of N transceivers may receive N LO signals at M different time during a period, or (2) determine a sequence of M sets of N transceivers and perform time sequencing according to the sequence so that each of M sets of N transceivers may receive N LO signals, according to the sequence at M different times during the period. In some implementations, the seed device 550 may provide the same LO signal to the M sets of N transceivers substantially the same time.

In some implementations, the transceiver/TX amplifier device 502 may be implemented in a chip or integrated circuit including silicon photonics circuitry and/or silicon nitride ($Si_3N_4$)-based circuitry. For example, the plurality of transceivers 514-1, ..., 514-32 may be implemented in silicon photonics circuitry. LO optical paths 505, 507, 517, 527, 537, 547 and TX optical paths 506, 509, 508-1 to 508-4, 511, 512, 513, 523, 533, 543 may be implemented in silicon nitride ($Si_3N_4$)-based circuitry.

In some implementations, the seed device 550 may be implemented in a chip or integrated circuit including III-V semiconductor circuitry and/or micro-optics circuitry. For example, the laser source 552, the modulator 556, and the pair of TPAs 557 may be implemented in III-V semiconductor circuitry. The optical isolator 554 and lenses 553, 555, 558, 559, 560, 561 may be implemented in micro-optics circuitry.

Figure 6:
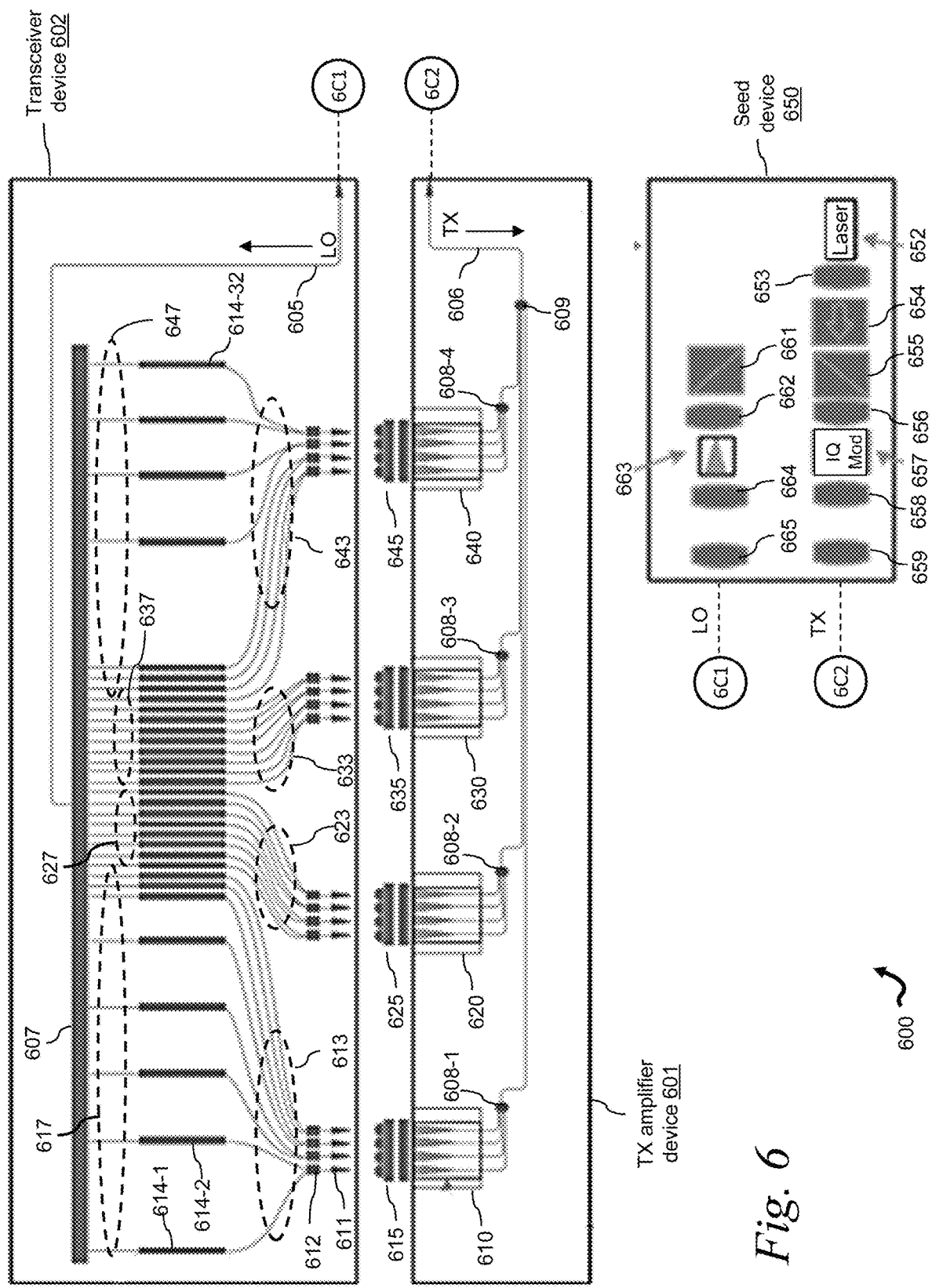
FIG. 6 is a diagram illustrating another example of a lidar system according to some implementations.

FIG. 6 is a diagram illustrating another example of a lidar system according to some implementations.

Referring to FIG. 6, a lidar sensor system 600 may include a TX amplifier device 601, a transceiver device 602, and a seed device 650. In some implementations, the seed device 650 may include a laser source 652, a first set of optics including lens 653 and an optical isolator 654, a second set of optics including a splitter 655, lens 656, a modulator 657

(e.g., I/Q modulator), and lenses 658, 659, and a third set of optics including a splitter 661, a lens 662, a TPA 663 and two lenses 664, 665. The first set of optics may form a common optical path. The second set of optics may form an LO optical path, while the third set of optics may form a TX optical path. With this configuration, the seed device 650 may generate, based on a light beam from the laser source 652, an LO signal through the common optical path and the LO optical path, and provide the LO optical signal to an LO input path 605 of the transceiver device 602. The seed device 650 may generate, based on a light beam from the laser source 652, a TX optical signal through the common optical path and the TX optical path, and provide the TX optical signal to a TX input path 606 of the TX amplifier device 601.

In some implementations, the TX amplifier device 601 may include a plurality of TX amplifier arrays 610, 620, 630, 640. Each TX amplifier array may include, at input sides thereof, a plurality of apertures (not shown) to which a TX optical signal generated by the seed device 650 may be provided. The TX optical signal generated by the seed device 650 may be provided to the plurality of TX amplifier arrays through one or more splitters 608-1, 608-2, 608-3, 608-4, 609. The one or more splitters may be one or more fiber splitters. A splitter may be coupled to an input side of an optical amplifier using one of butt coupling or lens coupling. In this manner, the seed device 650 can seed multiple TX amplifiers (e.g., tapered SOAs or a tapered SOA array) with multiple apertures with one optical signal. A plurality of sets of lenses 615, 625, 635, 645 may be coupled to the TX amplifier device 601 at respective portions corresponding to output sides of the TX amplifier arrays 610, 620, 630, 640.

In some implementations, the transceiver device 602 may include a plurality of transceivers 614-1, 614-2, . . . , 614-32. Each of the plurality of transceivers may have configuration similar to that of the single-channel transceiver 480 in FIG. 4C. The plurality of TX amplifier arrays 610, 620, 630, 640 may output amplified TX optical signals to respective TX input terminals of the plurality of transceivers through waveguide circuits (e.g., waveguide circuits 611), a plurality of splitters (e.g., splitter 612), and a plurality of split TX optical paths 613, 623, 633, 643. Examples of the waveguide circuits 611 may include fiber cables or a fiber array implemented in silicon photonics circuitry. For example, as shown in FIG. 6, the plurality of transceivers may include four (4) sets of eight (8) transceivers (M=4, N=8). With this configuration, a processor (e.g., processor 340 in FIG. 3B) of the lidar sensor system may alternately (1) turn on the seed device 550 and (2) turn on the transceiver device 602/TX amplifier device 601, M times during a period to transmit M×N TX optical signals to an environment. The processor may turn on the seed device 650 with a first duty cycle and turn on the transceiver device 602/TX amplifier device 601 with a second duty cycle during the period to transmit M×N TX optsical signals to the environment. The processor may temporally multiplex M sets of N transceivers so that a (selected) set of N transceivers may transmit N TX optical signals to the environment at M different time during the period. The processor may determine a sequence of M sets of N transceivers and perform time sequencing according to the determined sequence so that each of M sets of N transceivers may transmit N TX optical signals to the environment, according to the sequence at M different times during the period.

In some implementations, the LO signal generated by the seed device 650 may be provided to respective LO input terminals of the plurality of transceivers 614-1, 614-2, . . . , 614-32 through a splitter (e.g., splitter 607) and a plurality of split optical LO paths 617, 627, 637, 647. With this configuration, the lidar sensor system 600 may be configured to generate and provide M×N LO signals to the plurality of transceivers. For example, the processor may (1) temporally multiplex M sets of N transceivers so that a (selected) set of N transceivers may receive N LO signals at M different time during a period, or (2) determine a sequence of M sets of N transceivers and perform time sequencing according to the sequence so that each of M sets of N transceivers may receive N LO signals, according to the sequence at M different times during the period. In some implementations, the seed device 650 may provide the same LO signal to the M sets of N transceivers substantially the same time.

In some implementations, the TX amplifier device 601 may be implemented in a chip or integrated circuit including silicon photonics circuitry and/or silicon nitride ($Si_3N_4$)-based circuitry. For example, the plurality of TX amplifier arrays 610, 620, 630, 640 may be implemented in III-V semiconductor circuitry. TX optical paths 606, 609, 608-1 to 608-4 may be implemented in silicon photonics circuitry including silicon nitride ($Si_3N_4$)-based circuitry.

In some implementations, the transceiver device 602 may be implemented in a chip or integrated circuit including silicon photonics circuitry and/or silicon nitride ($Si_3N_4$)-based circuitry. For example, the plurality of transceivers 614-1, . . . , 614-32 may be implemented in silicon photonics circuitry. LO optical paths 605, 607, 617, 627, 637, 647 and TX optical paths 611, 612, 613, 623, 633, 643 may be implemented in silicon nitride ($Si_3N_4$)-based circuitry.

In some implementations, the seed device 650 may be implemented in a chip or integrated circuit including III-V semiconductor circuitry and/or micro-optics circuitry. For example, the laser source 652, the modulator 657, and the TPAs 663 may be implemented in III-V semiconductor circuitry. The optical isolator 654, optical splitters 661, 655 and lenses 653, 656, 658, 659, 662, 664, 665 may be implemented in micro-optics circuitry.

Figure 7:
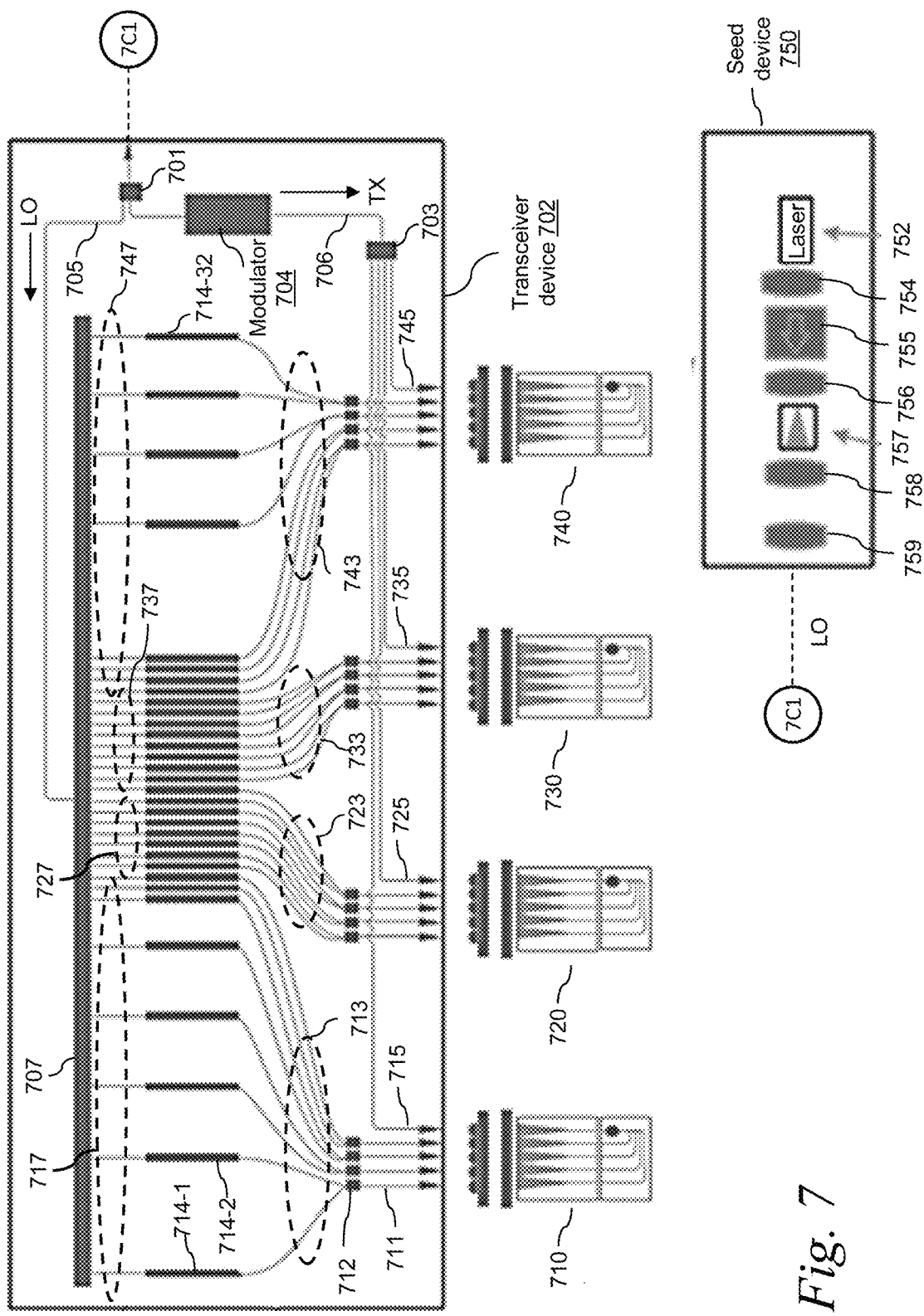
FIG. 7 is a diagram illustrating another example of a lidar system according to some implementations.

FIG. 7 is a diagram illustrating another example of a lidar system according to some implementations.

Referring to FIG. 7, a lidar sensor system 700 may include a seed device 750 and a transceiver device 702. In some implementations, the seed device 750 may include a laser source 752, an optical isolator 755, a TPA 757, and lenses 754, 756, 758, 759, which form an LO optical path. With this configuration, the seed device 750 may generate, based on a light beam from the laser source 752, an LO signal through the LO optical path, and provide the LO optical signal to an LO input path 705 of the transceiver device 702.

In some implementations, the lidar sensor system 700 may include a plurality of TX amplifier arrays 710, 720, 730, 740, each including five (5) TPAs. Each of the plurality of TX amplifier arrays 710, 720, 730, 740 may be implemented in a U-turn chip which has configuration similar to that of the chip 440 or 450 in FIG. 4B.

In some implementations, the transceiver device 702 may include a splitter 701, a splitter 703, and a modulator 704. The modulator 704 may receive the LO optical signal from the seed device 750 through the splitter 701, generate, based on the LO optical signal, a TX optical signal, and provide the TX optical signal to a TX input path 706 of the transceiver device 702. Each of the plurality of TX amplifier arrays 710, 720, 730, 740 may receive, through the splitter 703, the TX optical signal at a respective TX input path 715, 725, 735, 745. In response to receiving the TX optical signal, each TX amplifier array may output amplified TX signals from 4

TPAs in the array (e.g., 4 leftmost TPAs) to one of four (4) sets of eight (8) transceivers (M=4, N=8).

In some implementations, the transceiver device 702 may include a plurality of transceivers 714-1, 714-2, . . . , 714-32. Each of the plurality of transceivers may have configuration similar to that of the single-channel transceiver 480 in FIG. 4C. As described above, the plurality of TX amplifier arrays 710, 720, 730, 740 may output amplified TX optical signals to respective TX input terminals of the plurality of transceivers through waveguide circuits (e.g., waveguide circuits 711), a plurality of splitters (e.g., splitter 712), and a plurality of split TX optical paths 713, 723, 733, 743. Examples of the waveguide circuits 711 may include fiber cables or a fiber array implemented in silicon photonics circuitry. For example, as shown in FIG. 7, the plurality of transceivers may include four (4) sets of eight (8) transceivers (M=4, N=8). With this configuration, a processor (e.g., processor 340 in FIG. 3B) of the lidar sensor system may alternately turn on the seed device 750 and turn on the transceiver device 702/the plurality of TX amplifier arrays M times during a period to transmit M×N TX optical signals to an environment. The processor may turn on the seed device 750 with a first duty cycle and turn on the transceiver device 702/the plurality of TX amplifier arrays with a second duty cycle during the period to transmit M×N TX optical signals to the environment. The processor may temporally multiplex M sets of N transceivers so that a (selected) set of N transceivers may transmit N TX optical signals to the environment at M different time during the period. The processor may determine a sequence of M sets of N transceivers and perform time sequencing according to the determined sequence so that each of M sets of N transceivers may transmit N TX optical signals to the environment, according to the sequence at M different times during the period.

In some implementations, the LO signal generated by the seed device may be provided to respective LO input terminals of the plurality of transceivers 714-1, 714-2, . . . , 714-32 through a splitter (e.g., splitter 707) and a plurality of split optical LO paths 717, 727, 737, 747. With this configuration, the lidar sensor system 700 may be configured to generate and provide M×N LO signals to the plurality of transceivers. For example, the processor may (1) temporally multiplex M sets of N transceivers so that a (selected) set of N transceivers may receive N LO signals at M different time during a period, or (2) determine a sequence of M sets of N transceivers and perform time sequencing according to the sequence so that each of M sets of N transceivers may receive N LO signals, according to the sequence at M different times during the period. In some implementations, the seed device 750 may provide the same LO signal to the M sets of N transceivers substantially the same time.

In some implementations, the transceiver device 702 may be implemented in a chip or integrated circuit including silicon photonics circuitry and/or silicon nitride ($Si_3N_4$)-based circuitry. For example, the plurality of transceivers 714-1, . . . , 714-32 and modulator 704 may be implemented in silicon photonics circuitry. LO optical paths 701, 705, 707, 717, 727, 737, 747 and TX optical paths 706, 703, 711, 712, 713, 723, 733, 743, 715, 725, 735, 745 may be implemented in silicon nitride ($Si_3N_4$)-based circuitry.

In some implementations, the seed device 750 may be implemented in a chip or integrated circuit including III-V semiconductor circuitry and/or micro-optics circuitry. For example, the laser source 752 and the TPA 757 may be implemented in III-V semiconductor circuitry. The optical isolator 755 and lenses 754, 756, 758, 759 may be implemented in micro-optics circuitry.

Figure 8:
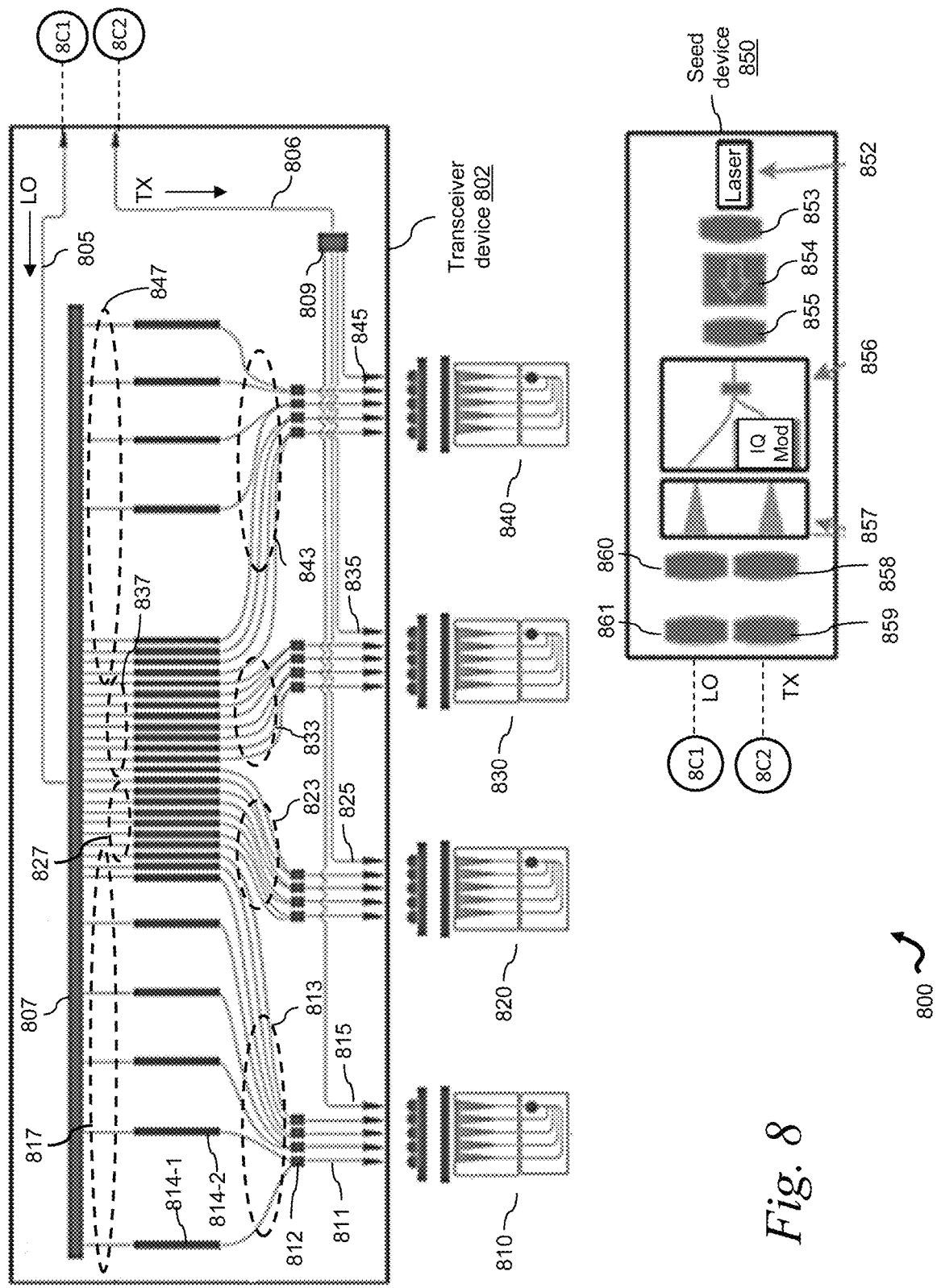
FIG. 8 is a diagram illustrating another example of a lidar system according to some implementations.

FIG. 8 is a diagram illustrating another example of a lidar system according to some implementations.

Referring to FIG. 8, a lidar sensor system 800 may include a seed device 850 and a transceiver device 802. In some implementations, the seed device 850 may include a laser source 852, a first set of optics including lens 853, an optical isolator 854, lens 855, a modulator 856 (e.g., I/Q modulator), a pair of tapered optical amplifiers (TPAs) 857, a second set of optics including lenses 858, 859, and a third set of optics including lenses 860, 861. The first set of optics may form a common optical path. An upper TPA in the pair 857 and the second set of optics may form an LO optical path, while a lower TPA in the pair 857 and the third set of optics may form a TX optical path. With this configuration, the seed device 850 may generate, based on a light beam from the laser source 852, an LO signal through the common optical path and the LO optical path, and provide the LO optical signal to an LO input path 805 of the transceiver device 802. The seed device 850 may generate, based on a light beam from the laser source 852, a TX optical signal through the common optical path and the TX optical path, and provide the TX optical signal to a TX input path 806 of the transceiver device 802.

In some implementations, the lidar sensor system 800 may include a plurality of TX amplifier arrays 810, 820, 830, 840, each including five (5) TPAs. Each of the plurality of TX amplifier arrays 810, 820, 830, 840 may be implemented in a U-turn chip which has configuration similar to that of the chip 440 or 450 in FIG. 4B.

In some implementations, each of the plurality of TX amplifier arrays 810, 820, 830, 840 may receive, through a splitter 809, the TX optical signal at a respective TX input path 815, 825, 835, 845. In response to receiving the TX optical signal, each TX amplifier array may output amplified TX signals from 4 TPAs in the array (e.g., 4 leftmost TPAs) to one of four (4) sets of eight (8) transceivers (M=4, N=8).

In some implementations, the transceiver device 802 may include a plurality of transceivers 814-1, 814-2, . . . , 814-32. Each of the plurality of transceivers may have configuration similar to that of the single-channel transceiver 480 in FIG. 4C. As described above, the plurality of TX amplifier arrays 810, 820, 830, 840 may output amplified TX optical signals to respective TX input terminals of the plurality of transceivers through waveguide circuits (e.g., waveguide circuits 811), a plurality of splitters (e.g., splitter 812), and a plurality of split TX optical paths 813, 823, 833, 843. Examples of the waveguide circuits 811 may include fiber cables or a fiber array implemented in silicon photonics circuitry. For example, as shown in FIG. 8, the plurality of transceivers may include four (4) sets of eight (8) transceivers (M=4, N=8). With this configuration, a processor (e.g., processor 340 in FIG. 3B) of the lidar sensor system may alternately turn on the seed device 850 and turn on the transceiver device 802/the plurality of TX amplifier arrays M times during a period to transmit M×N TX optical signals to an environment. The processor may turn on the seed device 850 with a first duty cycle and turn on the transceiver device 802/the plurality of TX amplifier arrays with a second duty cycle during the period to transmit M×N TX optical signals to the environment. The processor may temporally multiplex M sets of N transceivers so that a (selected) set of N transceivers may transmit N TX optical signals to the environment at M different time during the period. The processor may determine a sequence of M sets of N transceivers and perform time sequencing according to the determined sequence so that each of M sets of N transceivers may transmit N TX optical signals to the environment, according to the sequence at M different times during the period.

In some implementations, the LO signal generated by the seed device may be provided to respective LO input terminals of the plurality of transceivers 814-1, 814-2, . . . , 814-32 through a splitter (e.g., splitter 807) and a plurality of split optical LO paths 817, 827, 837, 847. With this configuration, the lidar sensor system 800 may be configured to generate and provide M×N LO signals to the plurality of transceivers. For example, the processor may (1) temporally multiplex M sets of N transceivers so that a (selected) set of N transceivers may receive N LO signals at M different time during a period, or (2) determine a sequence of M sets of N transceivers and perform time sequencing according to the sequence so that each of M sets of N transceivers may receive N LO signals, according to the sequence at M different times during the period. In some implementations, the seed device 850 may provide the same LO signal to the M sets of N transceivers substantially the same time.

In some implementations, the transceiver device 802 may be implemented in a chip or integrated circuit including silicon photonics circuitry and/or silicon nitride ($Si_3N_4$)-based circuitry. For example, the plurality of transceivers 814-1, . . . , 814-32 may be implemented in silicon photonics circuitry. LO optical paths 805, 807, 817, 827, 837, 847 and TX optical paths 806, 811, 812, 813, 823, 833, 843, 815, 825, 835, 845 may be implemented in silicon nitride ($Si_3N_4$)-based circuitry.

In some implementations, the seed device 850 may be implemented in a chip or integrated circuit including III-V semiconductor circuitry and/or micro-optics circuitry. For example, the laser source 852, the modulator 856, and the pair of TPAs 857 may be implemented in III-V semiconductor circuitry. The optical isolator 854 and lenses 853, 855, 858, 859, 860, 861 may be implemented in micro-optics circuitry.

Figure 9:
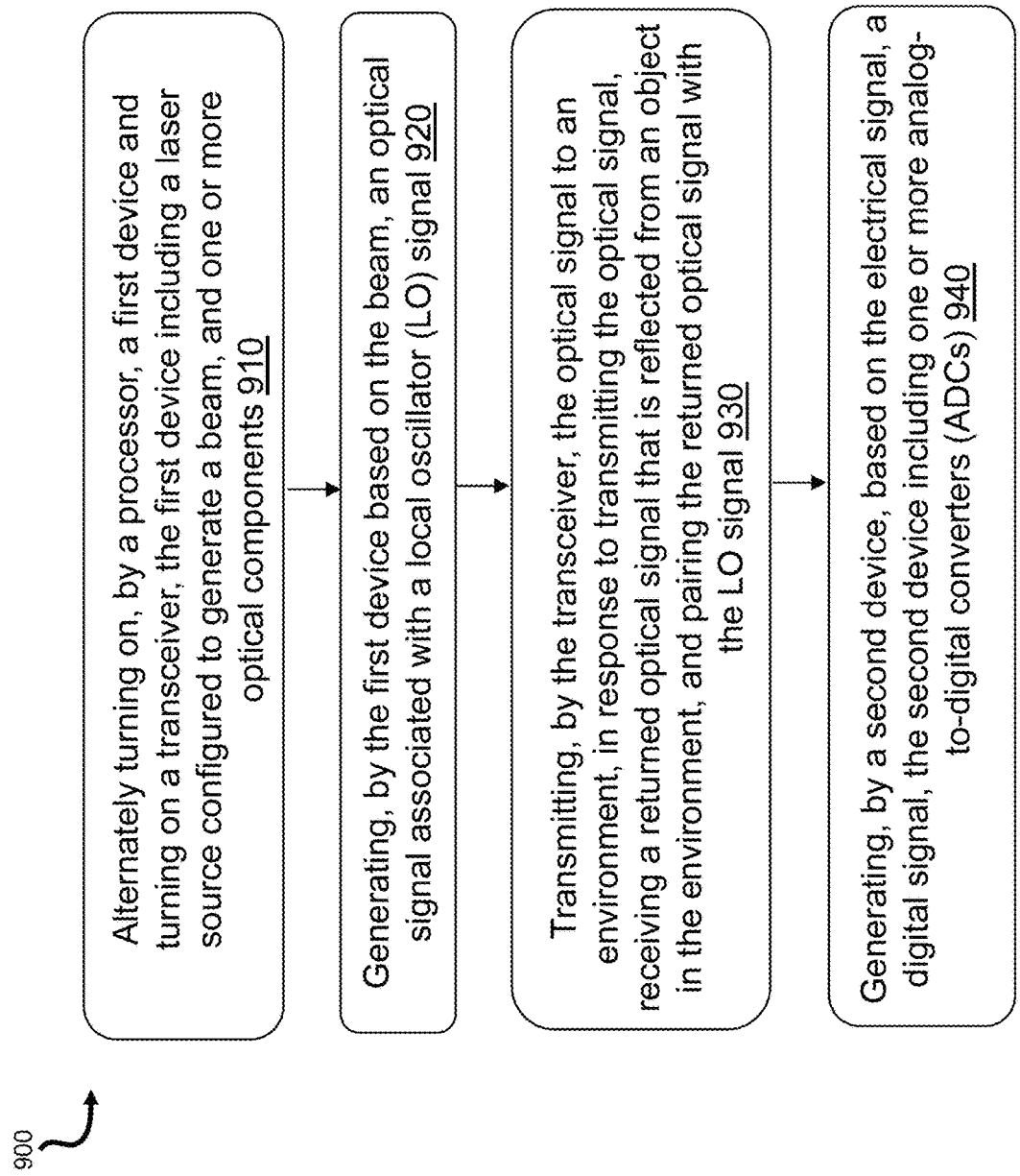
FIG. 9 is a flowchart illustrating an example methodology for controlling a lidar system, according to some implementations.

FIG. 9 is a flowchart illustrating an example methodology for controlling a lidar system (e.g., lidar sensor system 301, 350, 500, 600, 700, 800), according to some implementations. The system may include a transceiver (e.g., transceivers 307, 367, 480, 502, 602, 702, 802), a first device (e.g., photonics module 303, seed device 382, 550, 650, 750, 850) including a laser source configured to generate a beam, and one or more optical components, a second device (e.g., lidar processing device 305, 370) including one or more analog-to-digital converters (ADCs), and a processor (e.g., processor 340, 390, 1000).

In some implementations, the transceiver includes at least one of silicon photonics circuitry, photonic lightwave circuit (PLC), or III-V semiconductor circuitry. In some implementations, the first device includes at least one of silicon photonics circuitry, PLC, or III-V semiconductor circuitry. In some implementations, the second device includes at least one of silicon photonics circuitry, PLC, or III-V semiconductor circuitry.

In some implementations, the transceiver may have a first group of N transmit (TX) channels (e.g., N-channel transmitter 320-1 when M=2), a second group of N TX channels (e.g., N-channel transmitter 320-2 when M=2), and 2N receive (RX) channels (e.g., N-channel receivers 322-1 and 322-2 when M=2), wherein N is an integer. The second device may have 2N channels. N may be greater than or equal to 8. For example, N may be in the range from 8 to 16, inclusive.

In some implementations, the lidar system may further include a plurality of optical amplifiers (e.g., optical amplifiers 306, 384, 422, 426, 440, 450, 510, 520, 530, 540, 610, 620, 630, 640, 710, 720, 730, 740, 810, 820, 830, 840) configured to provide amplified optical signals to the first group of N TX channels. The number of the plurality of optical amplifiers may be less than N. The plurality of optical amplifiers may include one or more tapered optical amplifiers (TPAs). The one or more TPAs may contain a tapered section in which a cross-section area of an amplified beam is gradually increased. The one or more TPAs may be one or more tapered semiconductor optical amplifiers (SOAs).

In some implementations, the first device may be configured to provide, based on the beam, a seed optical signal (e.g., TX optical signal) to the plurality of optical amplifiers. The lidar system may further include a splitter (e.g., splitter 509, 508-1, 508-2, 508-3, 508-4, 609, 608-1, 608-2, 608-3, 608-4, 701, 703, 809). The first device may be configured to provide the seed optical signal to the plurality of optical amplifiers through the splitter. The splitter may be coupled to an input side of an optical amplifier using one of butt coupling or lens coupling.

In some implementations, the transceiver may be an integrated circuit (e.g., transceiver chip 480, 602, 702, 802) including at least one of silicon photonics circuitry, PLC, or III-V semiconductor circuitry. In some implementations, the transceiver may include a transmitter device (e.g., transmitter 320-1, . . . , 320-M) and a receiver device (e.g., receiver 322-1, . . . , 322-M). One of the transmitter device or the receiver device is an integrated circuit including at least one of silicon photonics circuitry, PLC, or III-V semiconductor circuitry.

In this example methodology, a process 900 begins at step 910 by alternately turning on, by a processor, the first device (e.g., seed device 382, 550, 650, 750, 850) and turning on the transceiver (e.g., transceivers 307, 367, 480, 502, 602, 702, 802). In some implementations, the processor may be configured to periodically turn on the first device with a first duty cycle and turn on the transceiver with a second duty cycle.

For example, referring to FIG. 3B, the lidar sensor system 350 may be configured to generate and transmit M×N optical signals (e.g., M≥2, N≥8) by (1) alternately turning on the photonics module 380 and turning on the TX/RX/optics device 360 (or a set of N transceivers thereof) M times or (2) temporally multiplexing M sets of N transceivers, thereby transmitting M×N optical signals to an environment. In response to transmitting the optical signals, the plurality of sets of transceivers (e.g., M sets of N single-channel transceiver or M number of N-channel transceiver) may receive returned signals in M×N channels, and the lidar processing device 350 may then process the returned optical signals in M×N channels. In this manner, the lidar processing device 370 (or ADCs 373) can be efficiently shared among the plurality of sets of transceivers (e.g., M sets of N single-channel transceiver or M number of N-channel transceiver).

At step 920, in some implementations, the first device may be configured to generate, based on the beam, an optical signal associated with a local oscillator (LO) signal, At step 930, in some implementations, the transceiver may be configured to transmit the optical signal to an environment, in response to transmitting the optical signal, receiving a returned optical signal that is reflected from an object in the environment, and pairing the returned optical signal with the LO signal.

For example, referring to FIG. 3A, the first device (e.g., modulator 304B) may be configured to generate a first optical signal associated with a first LO signal. In response to the first device generating the first optical signal, the transceiver (e.g., transceiver 307) may be configured to transmit the first optical signal to the environment through the first group of N TX channels (e.g., transmitter 320-1 when M=2). In response to the transceiver transmitting the first optical signal, the first device may be configured to generate a second optical signal associated with a second LO signal. In response to the first device generating the second optical signal, the transceiver may be configured to transmit the second optical signal to the environment through the second group of N TX channels (e.g., transmitter 320-2 when M=2).

In some implementations, in response to turning on the first device, the first device may be configured to selectively provide the optical signal to one of the first group of N TX channels (e.g., transmitter 320-1 when M=2) or the second group of N TX channels (e.g., transmitter 320-2 when M=2). In response to turning on the transceiver, the transceiver may be configured to transmit the optical signal to the environment through the one of the first group of N TX channels or the second group of N TX channels, receive, through the 2N RX channels (e.g., receivers 322-1 and 322-2 when M=2), the returned optical signal, and pair the returned optical signal with the LO signal to generate the electrical signal.

At step 940, in some implementations, the second device device (e.g., lidar processing device 305 in FIG. 3A) may be configured to generate, based on the electrical signal, a digital signal. For example, referring to FIG. 3A, the one or more ADCs 324 of the lidar processing device 305 may be configured to generate first and second digital signals based on the first and second electrical signals received from the TX/RX/optics device 307 through the one or more amplifiers 314, and provide the first and second digital signals to the autonomous vehicle control system 120.

Figure 10:
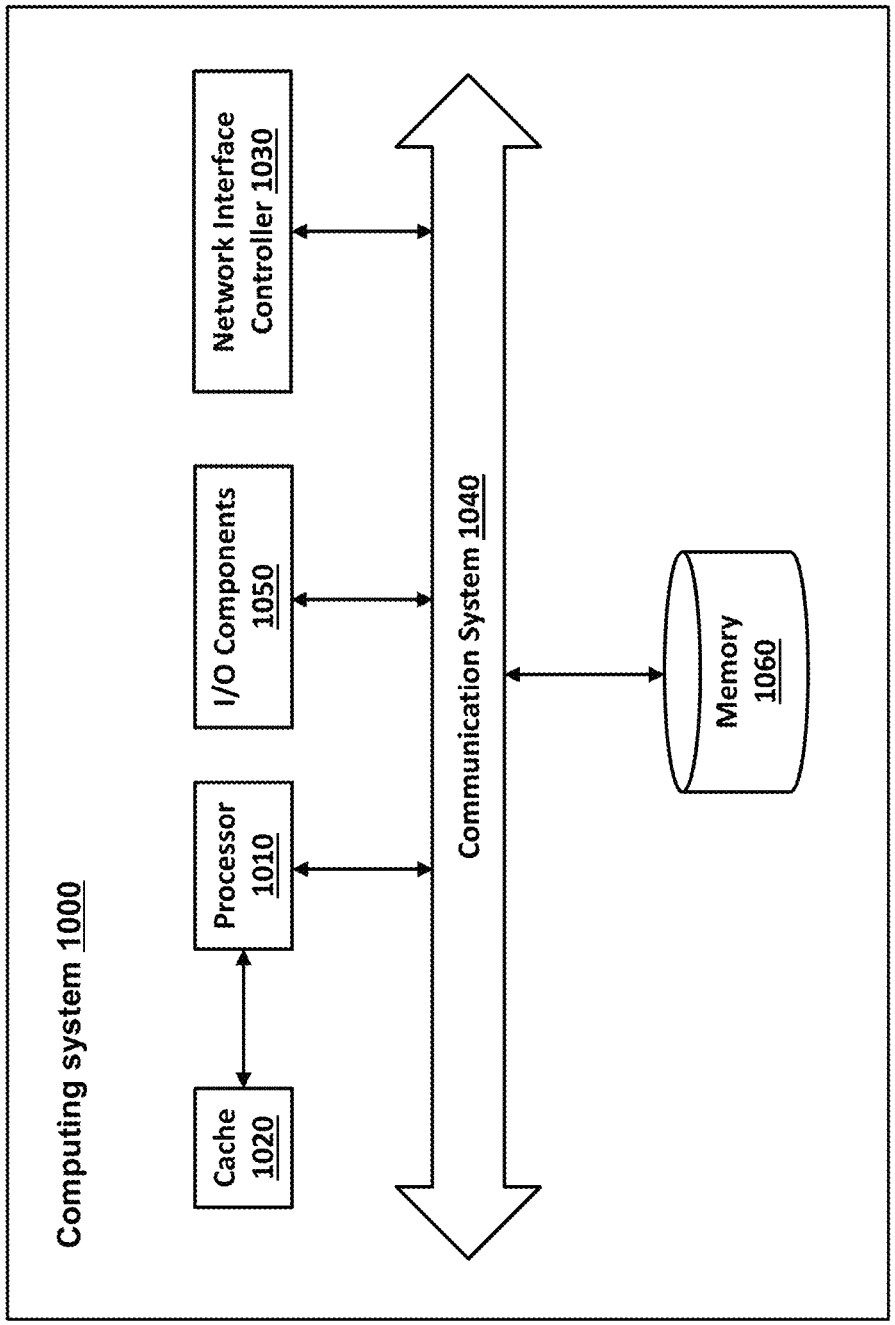
FIG. 10 is a block diagram illustrating an example of a computing system according to some implementations.

FIG. 10 is a block diagram illustrating an example of a computing system according to some implementations.

Referring to FIG. 10, the illustrated example computing system 1000 includes one or more processors 1010 in communication, through a communication system 1040 (e.g., bus), with memory 1060, at least one network interface controller 1030 with network interface port for connection to a network (not shown), and other components, e.g., an input/output ("I/O") components interface 1050 connecting to a display (not illustrated) and an input device (not illustrated). Generally, the processor(s) 1010 will execute instructions (or computer programs) received from memory. The processor(s) 1010 illustrated incorporate, or are directly connected to, cache memory 1020. In some instances, instructions are read from memory 1060 into the cache memory 1020 and executed by the processor(s) 1010 from the cache memory 1020.

In more detail, the processor(s) 1010 may be any logic circuitry that processes instructions, e.g., instructions fetched from the memory 1060 or cache 1020. In some implementations, the processor(s) 1010 are microprocessor units or special purpose processors. The computing device 1000 may be based on any processor, or set of processors, capable of operating as described herein. The processor(s) 1010 may be single core or multi-core processor(s). The processor(s) 1010 may be multiple distinct processors.

The memory 1060 may be any device suitable for storing computer readable data. The memory 1060 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 1000 may have any number of memory devices as the memory 1060.

The cache memory 1020 is generally a form of computer memory placed in close proximity to the processor(s) 1010 for fast read times. In some implementations, the cache memory 1020 is part of, or on the same chip as, the processor(s) 1010. In some implementations, there are multiple levels of cache 1020, e.g., L2 and L3 cache layers.

The network interface controller 1030 manages data exchanges through the network interface (sometimes referred to as network interface ports). The network interface controller 1030 handles the physical and data link layers of the OSI model for network communication. In some implementations, some of the network interface controller's tasks are handled by one or more of the processor(s) 1010. In some implementations, the network interface controller 1030 is part of a processor 1010. In some implementations, a computing system 1000 has multiple network interfaces controlled by a single controller 1030. In some implementations, a computing system 1000 has multiple network interface controllers 1030. In some implementations, each network interface is a connection point for a physical network link (e.g., a cat-5 Ethernet link). In some implementations, the network interface controller 1030 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 1030 implements one or more network protocols such as Ethernet. Generally, a computing device 1000 exchanges data with other computing devices through physical or wireless links through a network interface. The network interface may link directly to another device or to another device through an intermediary device, e.g., a network device such as a hub, a bridge, a switch, or a router, connecting the computing device 1000 to a data network such as the Internet.

The computing system 1000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 1000 may include an interface (e.g., a universal serial bus (USB) interface) for connecting input devices, output devices, or additional memory devices (e.g., portable flash drive or external media drive). In some implementations, a computing device 1000 includes an additional device such as a co-processor, e.g., a math co-processor can assist the processor 1010 with high precision or complex calculations.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A light detection and ranging (lidar) system for a vehicle comprising:
   a transceiver;
   a first device including a laser source configured to generate a beam, and one or more optical components;

a second device including one or more analog-to-digital converters (ADCs); and a processor configured to alternately (1) operate the first device to generate, based on the beam, an optical signal associated with a local oscillator (LO) signal, and (2) operate the transceiver to transmit the optical signal to an environment, wherein in response to transmitting the optical signal, the transceiver is configured to receive a returned optical signal that is reflected from an object in the environment, and pair the returned optical signal with the LO signal to generate an electrical signal, and the second device is configured to generate, based on the electrical signal, a digital signal.

2. The lidar system of claim 1, wherein the processor is configured to periodically turn on the first device with a first duty cycle and turn on the transceiver with a second duty cycle.

3. The lidar system of claim 1, wherein the transceiver includes at least one of silicon photonics circuitry, photonic lightwave circuit (PLC), or III-V semiconductor circuitry.

4. The lidar system of claim 1, wherein the first device includes at least one of silicon photonics circuitry, PLC, or III-V semiconductor circuitry.

5. The lidar system of claim 1, wherein the second device includes at least one of silicon photonics circuitry, PLC, or III-V semiconductor circuitry.

6. The lidar system of claim 1, wherein the transceiver has a first group of N transmit (TX) channels, a second group of N TX channels, and 2N receive (RX) channels, wherein N is an integer, and the second device has 2N channels.

7. The lidar system of claim 6, wherein N is in the range from 8 to 16.

8. The lidar system of claim 6, wherein the first device is configured to generate a first optical signal associated with a first LO signal, in response to the first device generating the first optical signal, the transceiver is configured to transmit the first optical signal to the environment through the first group of N TX channels, in response to the transceiver transmitting the first optical signal, the first device is configured to generate a second optical signal associated with a second LO signal, and in response to the first device generating the second optical signal, the transceiver is configured to transmit the second optical signal to the environment through the second group of N TX channels.

9. The lidar system of claim 6, wherein in response to turning on the first device, the first device is configured to selectively provide the optical signal to one of the first group of N TX channels or the second group of N TX channels, in response to turning on the transceiver, the transceiver is configured to transmit the optical signal to the environment through the one of the first group of N TX channels or the second group of N TX channels, receive, through the 2N RX channels, the returned optical signal, and pair the returned optical signal with the LO signal to generate the electrical signal, and the second device is configured to generate, based on the electrical signal through the 2N channels of the second device, the digital signal.

10. The lidar system of claim 6, further comprising:

a plurality of optical amplifiers configured to provide amplified optical signals to the first group of N TX channels, wherein the number of the plurality of optical amplifiers is less than N.

11. The lidar system of claim 10, wherein the plurality of optical amplifiers include one or more tapered optical amplifiers (TPAs), wherein the one or more TPAs contain a tapered section in which a cross-section area of an amplified beam is gradually increased.

12. The lidar system of claim 11, wherein the one or more TPAs are one or more tapered semiconductor optical amplifiers (SOAs).

13. The lidar system of claim 10, wherein the first device is configured to provide, based on the beam, a seed optical signal to the plurality of optical amplifiers.

14. The lidar system of claim 13, further comprising a splitter, wherein the first device is configured to provide the seed optical signal to the plurality of optical amplifiers through the splitter.

15. The lidar system of claim 14, wherein the splitter is coupled to an input side of an optical amplifier using one of butt coupling or lens coupling.

16. The lidar system of claim 1, wherein the transceiver is an integrated circuit including at least one of silicon photonics circuitry, PLC, or III-V semiconductor circuitry.

17. The lidar system of claim 1, wherein the transceiver includes a transmitter device; and a receiver device.

18. The lidar system of claim 17, wherein one of the transmitter device or the receiver device is an integrated circuit including at least one of silicon photonics circuitry, PLC, or III-V semiconductor circuitry.

19. An autonomous vehicle control system comprising:

one or more processors; and one or more computer-readable storage mediums storing instructions which, when executed by the one or more processors, cause the one or more processors to:

alternately (1) operate a first device including a laser source to generate, based on a beam generated from the laser source, an optical signal associated with a local oscillator (LO) signal, and (2) operate a transceiver to transmit the optical signal to an environment, wherein the first device includes one or more optical components, in response to transmitting the optical signal, cause the transceiver to receive a returned optical signal that is reflected from an object in the environment, and pair the returned optical signal with the LO signal to generate an electrical signal, cause a second device to generate, based on the electrical signal, a digital signal wherein the second device includes one or more analog-to-digital converters (ADCs), and control operation of a vehicle using the digital signal.

20. An autonomous vehicle comprising:

at least one of a steering system or a braking system; and a vehicle controller comprising one or more processors configured to:

alternately (1) operate a first device including a laser source to generate, based on a beam generated from the laser source, an optical signal associated with a local oscillator (LO) signal, and (2) operate a transceiver to transmit the optical signal to an environment, wherein the first device includes one or more optical components, in response to transmitting the optical signal, cause a transceiver to receive a returned optical signal that is reflected from an object in the environment, pair the returned optical signal with the LO signal to generate an electrical signal, cause a second device to generate, based on the electrical signal, a digital signal, wherein the second device includes one or more analog-to-digital converters (ADCs), and control the at least one of the steering system or the braking system using the digital signal.

\* \* \* \* \*